(12) United States Patent
Soliman et al.

(10) Patent No.: US 12,289,151 B2
(45) Date of Patent: Apr. 29, 2025

(54) COMMUNICATION SYSTEM WITH NETWORK-AWARE RECONFIGURABLE INTELLIGENT SURFACES

(71) Applicant: Apple Inc., Cupertino, CA (US)

(72) Inventors: Ahmed M Soliman, Munich (DE); Danila Zaev, Munich (DE); Ayman F Naguib, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 118 days.

(21) Appl. No.: 18/069,875

(22) Filed: Dec. 21, 2022

(65) Prior Publication Data

US 2024/0097759 A1 Mar. 21, 2024

Related U.S. Application Data

(60) Provisional application No. 63/407,811, filed on Sep. 19, 2022.

(51) Int. Cl.
*H04B 7/06* (2006.01)
(52) U.S. Cl.
CPC .......... *H04B 7/0617* (2013.01); *H04B 7/0632* (2013.01)
(58) Field of Classification Search
CPC .............................. H04B 7/0617; H04B 7/0632
See application file for complete search history.

(56) References Cited

U.S. PATENT DOCUMENTS

| 2017/0054216 A1 | 2/2017 | Shi et al. | |
| 2022/0232422 A1* | 7/2022 | Dai | H04W 72/21 |
| 2023/0086052 A1* | 3/2023 | Nam | H04W 84/047 |
| | | | 370/315 |
| 2023/0176174 A1* | 6/2023 | Penna | G01S 5/02521 |
| | | | 342/451 |
| 2024/0120966 A1* | 4/2024 | Elshafie | H04B 7/0617 |

OTHER PUBLICATIONS

Qingqing Wu et al., Intelligent Reflecting Surface Aided Wireless Communications: A Tutorial, IEEE Transactions on Communications, Downloaded Mar. 1, 2021, pp. 1-29, IEEE.

(Continued)

*Primary Examiner* — David S Huang
(74) *Attorney, Agent, or Firm* — Treyz Law Group, P.C.; Michael H. Lyons

(57) ABSTRACT

A communication system may include an access point (AP), user equipment (UE) device, and reconfigurable intelligent surface (RIS). The UE may control the RIS by transmitting control signals that configure antenna elements on the RIS. The RIS may reflect wireless signals between the UE and the AP. The RIS may be known to the network. The UE may transmit a report to the AP that includes information about the RIS. The UE may receive assistance information from the AP. The UE may control the RIS based at least in part on the assistance information. The UE may transmit measurement reports to the AP. The AP may update its signal beams based on the information about the RIS and the measurement reports. Providing the network with awareness of the RIS may serve to optimize the wireless performance of the UE device and/or the network.

20 Claims, 8 Drawing Sheets

(56) References Cited

OTHER PUBLICATIONS

C. Mukherjee et al., First Uni-Traveling Carrier Photodiode Compact Model Enabling Future Terahertz Communication System Design, ESSDERC 2019—49th European Solid-State Device Research Conference (ESSDERC), Sep. 23-26, 2019, pp. 150-153, IEEE, Cracow, Poland.

L. Zhang et al., Space-Time-Coding Digital Metasurfaces, 13th International Congress on Artificial Materials for Novel Wave Phenomena—Metamaterials Sep. 16, 2019-Sep. 21, 2019, pp. x-128-x-130, IEEE, Rome, Italy.

Ming Che et al., Optoelectronic THz-Wave Beam Steering by Arrayed Photomixers With Integrated Antennas, IEEE Photonics Technology Letters, Aug. 15, 2020, pp. 979-982, vol. 32, No. 16, IEEE.

Xiaoshen Song et al., Fully- / Partially-Connected Hybrid Beamforming Architectures for mmWave MU-MIMO, IEEE Transactions on Wireless Communications, vol. 19, Issue 3, Mar. 2020, pp. 1-16, IEEE.

Cyril C. Renaud et al., Antenna Integrated THz Uni-Traveling Carrier Photodiodes, IEEE Journal of Selected Topics in Quantum Electronics, Mar./Apr. 2018, pp. 1-11, vol. 24, No. 2, IEEE.

Michele Natrella et al., Accurate equivalent circuit model for millimetre-wave UTC photodiodes, Feb. 25, 2016, pp. 1-16, vol. 24, No. 5, Optics Express.

Xilong Pei et al., RIS-Aided Wireless Communications: Prototyping, Adaptive Beamforming, and Indoor/Outdoor Field Trials, Feb. 28, 2021, pp. 1-13.

Chhandak Mukherjee et al., Efficient compact modelling of UTC-photodiode towards terahertz communication system design, Solid-State Electronics, 2020, pp. 1-11, HAL.

U.S. Appl. No. 17/827,290, filed May 27, 2022.

\* cited by examiner

COMMUNICATION SYSTEM WITH NETWORK-AWARE RECONFIGURABLE INTELLIGENT SURFACES

This application claims the benefit of U.S. Provisional Patent Application No. 63/407,811, filed Sep. 19, 2022, which is hereby incorporated by reference herein in its entirety.

FIELD

This disclosure relates generally to electronic devices and, more particularly, to electronic devices with wireless circuitry.

BACKGROUND

Electronic devices are often provided with wireless capabilities. An electronic device with wireless capabilities has wireless circuitry that includes one or more antennas. The wireless circuitry is used to perform communications using radio-frequency signals conveyed by the antennas.

As software applications on electronic devices become more data-intensive over time, demand has grown for electronic devices that support wireless communications at higher data rates. However, the maximum data rate supported by electronic devices is limited by the frequency of the radio-frequency signals. As the frequency of the radio-frequency signals increases, it can become increasingly difficult to perform satisfactory wireless communications because the signals become subject to significant over-the-air attenuation and typically require line-of-sight.

SUMMARY

A communication system may include a network having a wireless access point (AP), may include a user equipment (UE) device, and may include a reconfigurable intelligent surface (RIS). The UE device may control the RIS by transmitting control signals that configure antenna elements on the RIS. The RIS may reflect wireless signals between the UE device and the AP while the antenna elements are configured based on the control signals.

The RIS may be known to the network. The UE device may transmit a report to the AP that includes information about the RIS. The UE device may receive assistance information from the AP. The UE device may control the RIS based at least in part on the assistance information received from the RIS. The assistance information may include channel condition information, for example. The UE device may also receive report configuration information from the AP. The UE device may transmit subsequent reports to the AP based on the report configuration information. The UE device may gather signal measurements performed by the UE device and/or beneficiary UE devices characterizing channel conditions of the system. The UE device may transmit the signal measurements to the AP in measurement reports.

The AP may update its network configuration based on the information about the RIS and the measurement reports received from the UE device. The AP may change its signal beam, may change a width of the signal beam, may increase a power of the signal beam, may generate concurrent signal beams for communicating with the UE device, and/or may transmit the assistance information based on the information about the RIS and the measurement reports received from the UE device. The concurrent signal beams may include a first signal beam pointed towards the UE device and a second signal beam that is reflected towards the UE device by the RIS. If desired, the AP may configure a network-controlled RIS. The wireless signals may be reflected off the network-controlled RIS and/or the UE device-controlled RIS in passing between the UE device and the AP. Providing the network with awareness of the RIS may serve to optimize the wireless performance of the UE device and/or the network.

An aspect of the disclosure provides a method of operating a user equipment (UE) device to communicate with a wireless access point. The method can include transmitting a control signal to a reconfigurable intelligent surface (RIS), wherein the control signal identifies a setting for antenna elements on the RIS. The method can include with one or more antennas, while the antenna elements on the RIS are configured using the setting, conveying wireless signals with the wireless access point via reflection off the RIS. The method can include transmitting, to the wireless access point, a message that includes information associated with the RIS.

An aspect of the disclosure provides a method of operating a wireless access point to communicate with a user equipment (UE) device. The method can include with one or more antennas, using a signal beam to convey wireless signals with the UE device via reflection off a reconfigurable intelligent surface (RIS), the RIS being controlled by the UE device. The method can include receiving a report from the UE device. The method can include with one or more processors, adjusting the signal beam based on the report.

An aspect of the disclosure provides a method of operating a first electronic device to wirelessly communicate with a second electronic device. The method can include with one or more antennas, conveying wireless data using a first signal beam pointed towards the second electronic device. The method can include with the one or more antennas, concurrent with conveying the wireless data using the first signal beam, conveying a duplicate of the wireless data using a second signal beam pointed towards a reconfigurable intelligent surface (RIS) that is configured to reflect the duplicate of the wireless data between the first electronic device and the second electronic device.

DETAILED DESCRIPTION

Figure 1:
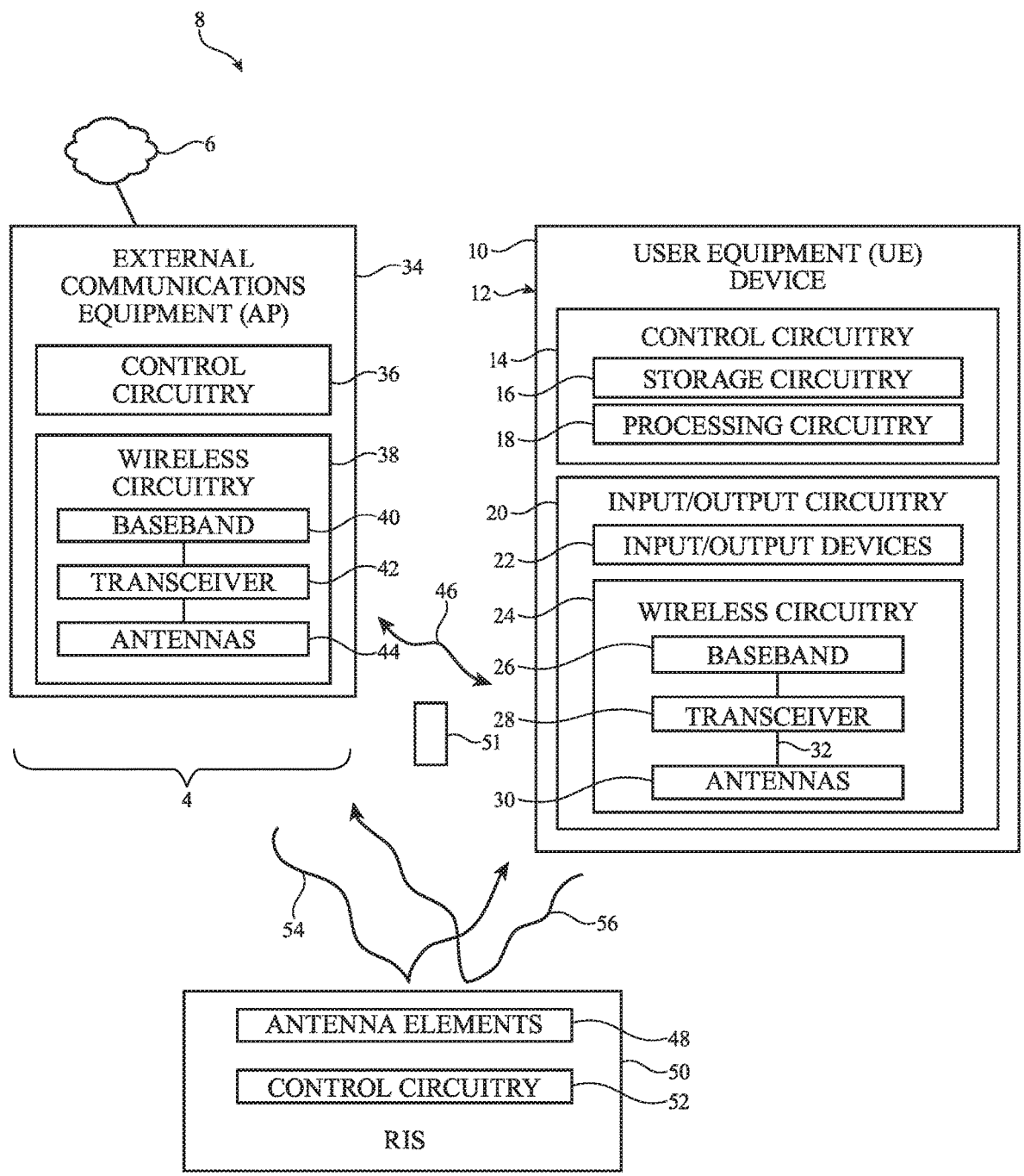
FIG. 1 is a schematic block diagram of an illustrative communications system having a user equipment (UE) device, external communications equipment, and a reconfigurable intelligent surface (RIS) in accordance with some embodiments.

FIG. 1 is a schematic diagram of an illustrative communications system 8 (sometimes referred to herein as communications network 8) for conveying wireless data between communications terminals. Communications system 8 may include network nodes (e.g., communications terminals). The network nodes may include user equipment (UE) such as one or more UE devices 10. The network nodes may also include external communications equipment (e.g., communications equipment other than UE devices 10) such as external communications equipment 34. External communications equipment 34 (sometimes referred to herein simply as external equipment 34) may include one or more electronic devices and may be a wireless base station, wireless access point, or other wireless equipment for example. An implementation in which external communications equipment 34 forms a wireless access point (AP) is described herein as an example. External communications equipment 34 may therefore sometimes be referred to herein as AP 34. UE device 10 and AP 34 may communicate with each other using one or more wireless communications links. If desired, UE devices 10 may wirelessly communicate with AP 34 without passing communications through any other intervening network nodes in communications system 8 (e.g., UE devices 10 may communicate directly with AP 34 over-the-air).

AP 34 may be communicably coupled to one or more other network nodes 6 in a larger communications network 4 via wired and/or wireless links Network 4 may include one or more wired communications links (e.g., communications links formed using cabling such as ethernet cables, radio-frequency cables such as coaxial cables or other transmission lines, optical fibers or other optical cables, etc.), one or more wireless communications links (e.g., short range wireless communications links that operate over a range of inches, feet, or tens of feet, medium range wireless communications links that operate over a range of hundreds of feet, thousands of feet, miles, or tens of miles, and/or long range wireless communications links that operate over a range of hundreds or thousands of miles, etc.), communications gateways, wireless access points, base stations, switches, routers, servers, modems, repeaters, telephone lines, network cards, line cards, portals, user equipment (e.g., computing devices, mobile devices, etc.), etc. Network 4 may include communications (network) nodes or terminals coupled together using these components or other components (e.g., some or all of a mesh network, relay network, ring network, local area network, wireless local area network, personal area network, cloud network, star network, tree network, or networks of communications nodes having other network topologies), the Internet, combinations of these, etc. UE devices 10 may send data to and/or may receive data from other nodes or terminals in network 4 via AP 34 (e.g., AP 34 may serve as an interface between UE devices 10 and the rest of the larger communications network). Network 4 may be managed, operated, controlled, or run by a corresponding network service provider (e.g., a cellular network carrier).

User equipment (UE) device 10 of FIG. 1 is an electronic device (sometimes referred to herein as electronic device 10 or device 10) and may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses, goggles, or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, equipment that implements the functionality of two or more of these devices, or other electronic equipment.

As shown in the functional block diagram of FIG. 1, UE device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, part or all of housing 12 may be formed from dielectric or other low-conductivity material (e.g., glass, ceramic, plastic, sapphire, etc.). In other situations, housing 12 or at least some of the structures that make up housing 12 may be formed from metal elements.

UE device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within UE device 10 and/or removable storage media.

Control circuitry 14 may include processing circuitry such as processing circuitry 18. Processing circuitry 18 may be used to control the operation of UE device 10. Processing circuitry 18 may include on one or more processors such as microprocessors, microcontrollers, digital signal processors, host processors, baseband processor integrated circuits, application specific integrated circuits, central processing units (CPUs), graphics processing units (GPUs), etc. Control circuitry 14 may be configured to perform operations in UE device 10 using hardware (e.g., dedicated hardware or circuitry), firmware, and/or software. Software code for performing operations in UE device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on UE device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultrawideband protocols), cellular telephone protocols (e.g., 3G protocols, 4G (LTE) protocols, 3GPP Fifth Generation (5G) New Radio (NR) protocols, Sixth Generation (6G) protocols, sub-THz protocols, THz protocols, etc.), antenna diversity protocols, satellite navigation system protocols (e.g., global positioning system (GPS) protocols, global navigation satellite system (GLONASS) protocols, etc.), antenna-based spatial ranging protocols, optical communications protocols, or any other desired communications protocols. Each communications protocol may be associated with a corresponding radio access technology (RAT) that specifies the physical connection methodology used in implementing the protocol.

UE device 10 may include input-output circuitry 20. Input-output circuitry 20 may include input-output devices 22. Input-output devices 22 may be used to allow data to be supplied to UE device 10 and to allow data to be provided from UE device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to UE device 10 using wired or wireless connections (e.g., some of input-output devices 22 may be peripherals that are coupled to a main processing unit or other portion of UE device 10 via a wired or wireless link).

Input-output circuitry 20 may include wireless circuitry 24 to support wireless communications. Wireless circuitry 24 (sometimes referred to herein as wireless communications circuitry 24) may include baseband circuitry such as baseband circuitry 26 (e.g., one or more baseband processors and/or other circuitry that operates at baseband), radio-frequency (RF) transceiver circuitry such as transceiver 28, and one or more antennas 30. If desired, wireless circuitry 24 may include multiple antennas 30 that are arranged into a phased antenna array (sometimes referred to as a phased array antenna) that conveys radio-frequency signals within a corresponding signal beam that can be steered in different directions. Baseband circuitry 26 may be coupled to transceiver 28 over one or more baseband data paths. Transceiver 28 may be coupled to antennas 30 over one or more radio-frequency transmission line paths 32. If desired, radio-frequency front end circuitry may be disposed on radio-frequency transmission line path(s) 32 between transceiver 28 and antennas 30.

In the example of FIG. 1, wireless circuitry 24 is illustrated as including only a single transceiver 28 and a single radio-frequency transmission line path 32 for the sake of clarity. In general, wireless circuitry 24 may include any desired number of transceivers 28, any desired number of radio-frequency transmission line paths 32, and any desired number of antennas 30. Each transceiver 28 may be coupled to one or more antennas 30 over respective radio-frequency transmission line paths 32. Radio-frequency transmission line path 32 may be coupled to antenna feeds on one or more antenna 30. Each antenna feed may, for example, include a positive antenna feed terminal and a ground antenna feed terminal. Radio-frequency transmission line path 32 may have a positive transmission line signal path that is coupled to the positive antenna feed terminal and may have a ground transmission line signal path that is coupled to the ground antenna feed terminal. This example is merely illustrative and, in general, antennas 30 may be fed using any desired antenna feeding scheme.

Radio-frequency transmission line path 32 may include transmission lines that are used to route radio-frequency antenna signals within UE device 10. Transmission lines in UE device 10 may include coaxial cables, microstrip transmission lines, stripline transmission lines, edge-coupled microstrip transmission lines, edge-coupled stripline transmission lines, transmission lines formed from combinations of transmission lines of these types, etc. Transmission lines in UE device 10 such as transmission lines in radio-frequency transmission line path 32 may be integrated into rigid and/or flexible printed circuit boards. In one embodiment, radio-frequency transmission line paths such as radio-frequency transmission line path 32 may also include transmission line conductors integrated within multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

In performing wireless transmission, baseband circuitry 26 may provide baseband signals to transceiver 28 (e.g., baseband signals that include wireless data for transmission). Transceiver 28 may include circuitry for converting the baseband signals received from baseband circuitry 26 into corresponding radio-frequency signals (e.g., for modulating the wireless data onto one or more carriers for transmission, synthesizing a transmit signal, etc.). For example, transceiver 28 may include mixer circuitry for up-converting the baseband signals to radio frequencies prior to transmission over antennas 30. Transceiver 28 may also include digital to analog converter (DAC) and/or analog to digital converter (ADC) circuitry for converting signals between digital and analog domains. Transceiver 28 may transmit the radio-frequency signals over antennas 30 via radio-frequency transmission line path 32. Antennas 30 may transmit the radio-frequency signals to external wireless equipment by radiating the radio-frequency signals into free space.

In performing wireless reception, antennas 30 may receive radio-frequency signals from AP 34. The received radio-frequency signals may be conveyed to transceiver 28 via radio-frequency transmission line path 32. Transceiver 28 may include circuitry for converting the received radio-frequency signals into corresponding baseband signals. For example, transceiver 28 may include mixer circuitry for down-converting the received radio-frequency signals to baseband frequencies prior to conveying the baseband signals to baseband circuitry 26 and may include demodulation circuitry for demodulating wireless data from the received signals.

Front end circuitry disposed on radio-frequency transmission line path 32 may include radio-frequency front end components that operate on radio-frequency signals conveyed over radio-frequency transmission line path 32. If desired, the radio-frequency front end components may be formed within one or more radio-frequency front end modules (FEMs). Each FEM may include a common substrate such as a printed circuit board substrate for each of the radio-frequency front end components in the FEM. The radio-frequency front end components in the front end circuitry may include switching circuitry (e.g., one or more radio-frequency switches), radio-frequency filter circuitry (e.g., low pass filters, high pass filters, notch filters, band pass filters, multiplexing circuitry, duplexer circuitry, diplexer circuitry, triplexer circuitry, etc.), impedance matching circuitry (e.g., circuitry that helps to match the impedance of antennas 30 to the impedance of radio-frequency transmission line path 32), antenna tuning circuitry (e.g., networks of capacitors, resistors, inductors, and/or switches that adjust the frequency response of antennas 30), radio-frequency amplifier circuitry (e.g., power amplifier circuitry and/or low-noise amplifier circuitry), radio-frequency coupler circuitry, charge pump circuitry, power management circuitry, digital control and interface circuitry, and/or any other desired circuitry that operates on the radio-frequency signals transmitted and/or received by antennas 30.

While control circuitry 14 is shown separately from wireless circuitry 24 in the example of FIG. 1 for the sake of clarity, wireless circuitry 24 may include processing circuitry that forms a part of processing circuitry 18 and/or storage circuitry that forms a part of storage circuitry 16 of control circuitry 14 (e.g., portions of control circuitry 14 may be implemented on wireless circuitry 24). As an example, baseband circuitry 26 and/or portions of transceiver 28 (e.g., a host processor on transceiver 28) may form a part of control circuitry 14. Baseband circuitry 26 may, for example, access a communication protocol stack on control circuitry 14 (e.g., storage circuitry 16) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer.

The term "convey wireless signals" as used herein means the transmission and/or reception of the wireless signals (e.g., for performing unidirectional and/or bidirectional wireless communications with external wireless communications equipment). Antennas 30 may transmit the wireless signals by radiating the signals into free space (or to free space through intervening device structures such as a dielectric cover layer). Antennas 30 may additionally or alternatively receive the wireless signals from free space (e.g., through intervening devices structures such as a dielectric cover layer). The transmission and reception of wireless signals by antennas 30 each involve the excitation or resonance of antenna currents on an antenna resonating (radiating) element in the antenna by the wireless signals within the frequency band(s) of operation of the antenna.

Transceiver circuitry 26 may use antenna(s) 30 to transmit and/or receive wireless signals that convey wireless communications data between UE device 10 and AP 34 (e.g., one or more other devices such as UE device 10, a wireless access point or base station, etc.). The wireless communications data may be conveyed bidirectionally or unidirectionally. The wireless communications data may, for example, include data that has been encoded into corresponding data packets such as wireless data associated with a telephone call, streaming media content, internet browsing, wireless data associated with software applications running on UE device 10, email messages, etc.

Additionally or alternatively, wireless circuitry 24 may use antenna(s) 30 to perform wireless (radio-frequency) sensing operations. The sensing operations may allow UE device 10 to detect (e.g., sense or identify) the presence, location, orientation, and/or velocity (motion) of objects external to UE device 10. Control circuitry 14 may use the detected presence, location, orientation, and/or velocity of the external objects to perform any desired device operations. As examples, control circuitry 14 may use the detected presence, location, orientation, and/or velocity of the external objects to identify a corresponding user input for one or more software applications running on UE device 10 such as a gesture input performed by the user's hand(s) or other body parts or performed by an external stylus, gaming controller, head-mounted device, or other peripheral devices or accessories, to determine when one or more antennas 30 needs to be disabled or provided with a reduced maximum transmit power level (e.g., for satisfying regulatory limits on radio-frequency exposure), to determine how to steer (form) a radio-frequency signal beam produced by antennas 30 for wireless circuitry 24 (e.g., in scenarios where antennas 30 include a phased array of antennas 30), to map or model the environment around UE device 10 (e.g., to produce a software model of the room where UE device 10 is located for use by an augmented reality application, gaming application, map application, home design application, engineering application, etc.), to detect the presence of obstacles in the vicinity of (e.g., around) UE device 10 or in the direction of motion of the user of UE device 10, etc. The sensing operations may, for example, involve the transmission of sensing signals (e.g., radar waveforms), the receipt of corresponding reflected signals (e.g., the transmitted waveforms that have reflected off of external objects), and the processing of the transmitted signals and the received reflected signals (e.g., using a radar scheme).

Wireless circuitry 24 may transmit and/or receive wireless signals within corresponding frequency bands of the electromagnetic spectrum (sometimes referred to herein as communications bands or simply as "bands"). The frequency bands handled by wireless circuitry 24 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (1-R1) bands below 10 GHz, 5G New Radio Frequency Range 2 (1-R2) bands between 20 and 60 GHz, 6G bands at sub-THz or THz frequencies greater than about 100 GHz, etc.), other centimeter or millimeter wave frequency bands between 10-100 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Over time, software applications on electronic devices such as UE device 10 have become more and more data intensive. Wireless circuitry on the electronic devices therefore needs to support data transfer at higher and higher data rates. In general, the data rates supported by the wireless circuitry are proportional to the frequency of the wireless signals conveyed by the wireless circuitry (e.g., higher frequencies can support higher data rates than lower frequencies). Wireless circuitry 24 may convey centimeter and millimeter wave signals to support relatively high data rates (e.g., because centimeter and millimeter wave signals are at relatively high frequencies between around 10 GHz and 100 GHz). However, the data rates supported by centimeter and millimeter wave signals may still be insufficient to meet all the data transfer needs of UE device 10. To support even higher data rates such as data rates up to 5-100 Gbps or higher, wireless circuitry 24 may convey wireless signals at frequencies greater than about 100 GHz.

As shown in FIG. 1, wireless circuitry 24 may transmit wireless signals 46 to AP 34 and/or may receive wireless signals 46 from AP 34. Wireless signals 46 may be tremendously high frequency (THF) signals (e.g., sub-THz or THz signals) at frequencies greater than around 100 GHz (e.g., between 100 GHz and 1 THz, between 80 GHz and 10 THz, between 100 GHz and 10 THz, between 100 GHz and 2 THz, between 200 GHz and 1 THz, between 300 GHz and 1 THz, between 300 GHz and 2 THz, between 70 GHz and 2 THz, between 300 GHz and 10 THz, between 100 GHz and 800 GHz, between 200 GHz and 1.5 THz, or within any desired sub-THz, THz, THF, or sub-millimeter frequency band such as a 6G frequency band), may be millimeter (mm) or centimeter (cm) wave signals between 10 GHz and around 70 GHz (e.g., 5G NR FR2 signals), or may be signals at frequencies less than 10 GHz (e.g., 5G NR FR1 signals, LTE signals, 3G signals, 2G signals, WLAN signals, Bluetooth signals, UWB signals, etc.).

If desired, the high data rates supported by THF signals may be leveraged by UE device 10 to perform cellular telephone voice and/or data communications (e.g., while supporting spatial multiplexing to provide further data bandwidth), to perform spatial ranging operations such as radar operations to detect the presence, location, and/or velocity of objects external to UE device 10, to perform automotive sensing (e.g., with enhanced security), to perform health/body monitoring on a user of UE device 10 or another person, to perform gas or chemical detection, to form a high data rate wireless connection between UE device 10 and another device or peripheral device (e.g., to form a high data rate connection between a display driver on UE device 10 and a display that displays ultra-high resolution video), to form a remote radio head (e.g., a flexible high data rate connection), to form a THF chip-to-chip connection within UE device 10 that supports high data rates (e.g., where one antenna 30 on a first chip in UE device 10 transmits THF signals 32 to another antenna 30 on a second chip in UE device 10), and/or to perform any other desired high data rate operations.

In implementations where wireless circuitry 24 conveys THF signals, wireless circuitry may include electro-optical circuitry if desired. The electro-optical circuitry may include light sources that generate first and second optical local oscillator (LO) signals. The first and second optical LO signals may be separated in frequency by the intended frequency of wireless signals 46. Wireless data may be modulated onto the first optical LO signal and one of the optical LO signals may be provided with an optical phase shift (e.g., to perform beamforming). The first and second optical LO signals may illuminate a photodiode that produces current at the frequency of wireless signals 46 when illuminated by the first and second optical LO signals. An antenna resonating element of a corresponding antenna 30 may convey the current produced by the photodiode and may radiate corresponding wireless signals 46. This is merely illustrative and, in general, wireless circuitry 24 may generate wireless signals 46 using any desired techniques.

Antennas 30 may be formed using any desired antenna structures. For example, antennas 30 may include antennas with resonating elements that are formed from loop antenna structures, patch antenna structures, inverted-F antenna structures, slot antenna structures, planar inverted-F antenna structures, helical antenna structures, monopole antennas, dipoles (e.g., planar dipole antennas such as bowtie antennas), hybrids of these designs, etc. Parasitic elements may be included in antennas 30 to adjust antenna performance.

If desired, two or more of antennas 30 may be integrated into a phased antenna array (sometimes referred to herein as a phased array antenna or an array of antenna elements). Each antenna 30 in the phased antenna array forms a respective antenna element of the phased antenna array. Each antenna 30 in the phased antenna array has a respective phase and magnitude controller that imparts the radio-frequency signals conveyed by that antenna with a respective phase and magnitude. The respective phases and magnitudes may be selected (e.g., by control circuitry 14) to configure the radio-frequency signals conveyed by the antennas 30 in the phased antenna array to constructively and destructively interfere in such a way that the radio-frequency signals collectively form a signal beam (e.g., a signal beam of wireless signals 46) oriented in a corresponding beam pointing direction (e.g., a direction of peak gain).

The control circuitry may adjust the phases and magnitudes to change (steer) the orientation of the signal beam (e.g., the beam pointing direction) to point in other directions over time. This process may sometimes also be referred to herein as beamforming. Beamforming may boost the gain of wireless signals 46 to help overcome over-the-air attenuation and the signal beam may be steered over time to point towards AP 34 even as the position and orientation of UE device 10 changes. The signal beams formed by antennas 30 of UE device 10 may sometimes be referred to herein as UE beams or UE signal beams Each UE beam may be oriented in a different respective direction (e.g., a beam pointing direction of peak signal gain). Each UE beam may be labeled by a corresponding UE beam index. UE device 10 may include or store a codebook (sometimes referred to herein as a UE codebook) that maps each of its UE beam indices to the corresponding phase and magnitude settings for each antenna 30 in a phased antenna array that configure the phased antenna array to form the UE beam associated with that UE beam index.

As shown in FIG. 1, AP 34 may also include control circuitry 36 (e.g., control circuitry having similar components and/or functionality as control circuitry 14 in UE device 10) and wireless circuitry 38 (e.g., wireless circuitry having similar components and/or functionality as wireless circuitry 24 in UE device 10). Wireless circuitry 38 may include baseband circuitry 40 and transceiver 42 (e.g., transceiver circuitry having similar components and/or functionality as transceiver circuitry 28 in UE device 10) coupled to two or more antennas 44 (e.g., antennas having similar components and/or functionality as antennas 30 in UE device 10). Antennas 44 may be arranged in one or more phased antenna arrays (e.g., phased antenna arrays that perform beamforming similar to phased antenna arrays of antennas 30 on UE device 10).

AP 34 may use wireless circuitry 38 to transmit a signal beam of wireless signals 46 to UE device 10 (e.g., as downlink (DL) signals transmitted in a downlink direction) and/or to receive a signal beam of wireless signals 46 transmitted by UE device 10 (e.g., as uplink (UL) signals transmitted in an uplink direction). The signal beams formed by antennas 44 of UE device 10 may sometimes be referred to herein as AP beams or AP signal beams Each AP beam may be oriented in a different respective direction (e.g., a beam pointing direction of peak signal gain). Each AP beam may be labeled by a corresponding AP beam index. AP 34 may include or store a codebook (sometimes referred to herein as an AP codebook) that maps each of its AP beam indices to the corresponding phase and magnitude settings for each antenna 44 in a phased antenna array that configure the phased antenna array to form the AP beam associated with that AP beam index.

While communications at high frequencies allow for extremely high data rates (e.g., greater than 100 Gbps), wireless signals 46 at such high frequencies are subject to significant attenuation during propagation over-the-air. Integrating antennas 30 and 44 into phased antenna arrays helps to counteract this attenuation by boosting the gain of the signals within a signal beam. However, signal beams are highly directive and may require a line-of-sight (LOS) between UE device 10 and AP 34. If an external object is present between AP 34 and UE device 10, the external object may block the LOS between UE device 10 and AP 34, which can disrupt wireless communications using wireless signals 46. If desired, an reconfigurable intelligent surface (RIS) may be used to allow UE device 10 and AP 34 to continue to communicate using wireless signals 46 even when an external object blocks the LOS between UE device 10 and AP 34 (or whenever direct over-the-air communications between AP 34 and UE device 10 otherwise exhibits less than optimal performance).

As shown in FIG. 1, system 8 may include one or more reconfigurable intelligent surfaces (RIS's) such as RIS 50. RIS 50 may sometimes also be referred to as an intelligent reconfigurable surface (IRS), an intelligent reflective/reflecting surface, a reflective intelligent surface, a reflective surface, a reflective device, a reconfigurable reflective device, a reconfigurable reflective surface, or a reconfigurable surface. AP 34 may be separated from UE device 10 by a line-of-sight (LOS) path. In some circumstances, an external object such as object 51 may block the LOS path. Object 51 may be, for example, part of a building such as a wall, window, floor, or ceiling (e.g., when UE device 10 is located inside), furniture, a body or body part, an animal, a cubicle wall, a vehicle, a landscape feature, or other obstacles or objects that may block the LOS path between AP 34 and UE device 10.

In the absence of external object 51, AP 34 may form a corresponding AP beam of wireless signals 46 oriented in the direction of UE device 10 and UE device 10 may form a corresponding UE beam of wireless signals 46 oriented in the direction of AP 34. UE device 10 and AP 34 can then convey wireless signals 46 over their respective signal beams and the LOS path. However, the presence of external object 51 prevents wireless signals 46 from being conveyed over the LOS path.

RIS 50 may be placed or disposed within system 8 in such a way so as to allow RIS 50 to reflect wireless signals 46 between UE device 10 and AP 34 despite the presence of external object 51 within the LOS path. More generally, RIS 50 may be used to reflect wireless signals 46 between UE device 10 and AP 34 when reflection via RIS 50 offers superior radio-frequency propagation conditions relative to the LOS path regardless of the presence of external object 51 (e.g., when the LOS path between AP 34 and RIS 50 and the LOS path between RIS 50 and UE device 10 exhibit superior propagation/channel conditions than the direct LOS path between UE device 10 and AP 34).

When RIS 50 is placed within system 8, AP 34 may transmit wireless signals 46 towards RIS 50 (e.g., within an AP beam oriented towards RIS 50 rather than towards UE device 10) and RIS 50 may reflect the wireless signals towards UE device 10, as shown by arrow 54. Conversely, UE device 10 may transmit wireless signals 46 towards RIS 50 (e.g., within a UE beam oriented towards RIS 50 rather than towards AP 34) and RIS 50 may reflect the wireless signals towards AP 34, as shown by arrow 56.

RIS 50 is an electronic device that includes a two-dimensional surface of engineered material (e.g., metal patches, metamaterials, etc.) having reconfigurable properties for performing (e.g., scattering/reflecting) communications between AP 34 and UE device 10. RIS 50 may include an array of reflective/scattering elements such as antenna elements 48 on an underlying substrate. Antenna elements 48 may also sometimes be referred to herein as reflective elements 48, reconfigurable antenna elements 48, reconfigurable reflective elements 48, scattering elements 48, reflectors 48, or reconfigurable reflectors 48.

The substrate may be a rigid or flexible printed circuit board, a package, a plastic substrate, meta-material, or any other desired substrate. The substrate may be planar or may be curved in one or more dimensions. If desired, the substrate and antenna elements 48 may be enclosed within a housing. The housing may be formed from materials that are transparent to wireless signals 46. If desired, RIS 50 may be disposed (e.g., layered) on an underlying electronic device. RIS 50 may also be provided with mounting structures (e.g., adhesive, brackets, a frame, screws, pins, clips, etc.) that can be used to affix or attach RIS 50 to an underlying structure such as another electronic device, a wall, the ceiling, the floor, furniture, etc. Disposing RIS 50 on a ceiling, wall, window, column, pillar, or at or adjacent to the corner of a room (e.g., a corner where two walls intersect, where a wall intersects with the floor or ceiling, where two walls and the floor intersect, or where two walls and the ceiling intersect), as examples, may be particularly helpful in allowing RIS 50 to reflect wireless signals between AP 34 and UE device 10 around various objects 51 that may be present (e.g., when AP 34 is located outside and UE device 10 is located inside, when AP 34 and UE device 10 are both located inside or outside, etc.).

RIS 50 may be a passive, adaptively controlled, reflecting surface and a powered device that includes control circuitry 52. Control circuitry 52 may help to control the operation of antenna elements 48 (e.g., one or more processors in control circuitry such as control circuitry 14). When electro-magnetic (EM) energy waves (e.g., waves of wireless signals 46) are incident on RIS 50, the wave is reflected by each antenna element 48 via re-radiation by each antenna element 48 with a respective phase and amplitude response. Antenna elements 48 may include passive reflectors (e.g., antenna resonating elements or other radio-frequency reflective elements). Each antenna element 48 may include an adjustable device that is programmed, set, and/or controlled by control circuitry 52 (e.g., using a control signal that includes a respective beamforming coefficient) to configure that antenna element 48 to reflect incident EM energy with the respective phase and amplitude response. The adjustable device may be a programmable photodiode, an adjustable impedance matching circuit, an adjustable phase shifter, an adjustable amplifier, a varactor diode, an antenna tuning circuit, etc.

Control circuitry 52 on RIS 50 may configure the reflective response of antenna elements 48 on a per-element or per-group-of-elements basis (e.g., where each antenna element has a respective programmed phase and amplitude response or the antenna elements in different sets/groups of antenna elements are each programmed to share the same respective phase and amplitude response across the set/group but with different phase and amplitude responses between sets/groups). The scattering, absorption, reflection, and diffraction properties of the entire RIS can therefore be changed over time and controlled (e.g., by software running on the RIS or other devices communicably coupled to the RIS such as UE device 10).

One way of achieving the per-element phase and amplitude response of antenna elements 48 is by adjusting the impedance of antenna elements 48, thereby controlling the complex reflection coefficient that determines the change in amplitude and phase of the re-radiated signal. The control circuitry 52 on RIS 50 may configure antenna elements 48 to exhibit impedances that serve to reflect wireless signals 46 incident from particular incident angles onto particular output angles. The antenna elements 48 (e.g., the antenna impedances) may be adjusted to change the angle with which incident wireless signals 46 are reflected off RIS 50.

For example, the control circuitry on RIS 50 may configure antenna elements 48 to reflect wireless signals 46 transmitted by AP 34 towards UE device 10 (as shown by arrow 54) and to reflect wireless signals 46 transmitted by UE device 10 towards AP 34 (as shown by arrow 56). In such an example, control circuitry 36 may configure (e.g., program) a phased antenna array of antennas 44 on AP 34 to form an AP beam oriented towards RIS 50, control circuitry 14 may configure (e.g., program) a phased antenna array of antennas 30 on UE device 10 to form a UE beam oriented towards RIS 50, control circuitry 52 may configure (e.g., program) antenna elements 48 to receive and re-radiate (e.g., effectively reflect) wireless signals incident from the direction of AP 34 towards/onto the direction of UE device 10 (as shown by arrow 54), and control circuitry 52 may configure (e.g., program) antenna elements 48 to receive and re-radiate (e.g., effectively reflect) wireless signals incident from the direction of UE device 10 towards-onto the direction of AP 34 (as shown by arrow 56). The antenna elements may be configured using respective beamforming coefficients. Control circuitry 52 on RIS 50 may set and adjust the adjustable devices coupled to antenna elements 48 (e.g., may set and adjust the impedances of antenna elements 48) over time to reflect wireless signals 46 incident from different selected incident angles onto different selected output angles.

To minimize the cost, complexity, and power consumption of RIS 50, RIS 50 may include only the components and control circuitry required to control and operate antenna elements 48 to reflect wireless signals 46. Such components and control circuitry may include, for example, the adjustable devices of antenna elements 48 as required to change the phase and magnitude responses of antenna elements 48 (based on corresponding beamforming coefficients) and thus the direction with which RIS 50 reflects wireless signals 46. The components may include, for example, components that adjust the impedances of antenna elements 48 so that each antenna element exhibits a respective complex reflection coefficient, which determines the phase and amplitude of the reflected (re-radiated) signal produced by each antenna element (e.g., such that the signals reflected across the array constructively and destructively interfere to form a reflected signal beam in a corresponding beam pointing direction).

All other components that would otherwise be present in UE device 10 or AP 34 may be omitted from RIS 50. For example, RIS 50 does not include baseband circuitry (e.g., baseband circuitry 26 or 40) and does not include transceiver circuitry (e.g., transceiver 42 or 28) coupled to antenna elements 48. Antenna elements 48 and RIS 50 therefore do not generate wireless data for transmission, do not synthesize radio-frequency signals for transmission, and do not receive and demodulate radio-frequency signals. RIS 50 may also be implemented without a display or user input device. In other words, the control circuitry on RIS 50 may adjust antenna elements 48 to direct and steer reflected wireless signals 46 without using antenna elements 48 to perform any data transmission or reception operations and without using antenna elements 48 to perform radio-frequency sensing operations.

This may serve to minimize the hardware cost and power consumption of RIS 50. If desired, RIS 50 may also include one or more antennas (e.g., antennas separate from the antenna elements 48 used to reflect wireless signals 46) and corresponding transceiver/baseband circuitry that uses the one or more antennas to convey control signals with AP 34 or UE device 10 (e.g., using a control channel plane and control RAT). Such control signals may be used to coordinate the operation of RIS 50 in conjunction with AP 34 and/or UE device 10 but requires much lower data rates and thus much fewer processing resources and much less power than transmitting or receiving wireless signals 46. These control signals may, for example, be transmitted by UE device 10 and/or AP 34 to configure the phase and magnitude responses of antenna elements 48 (e.g., the control signals may convey beamforming coefficients or information associated with beamforming coefficients). This may allow the calculation of phase and magnitude responses for antenna elements 48 to be offloaded from RIS 50, further reducing the processing resources and power required by RIS 50. In other implementations, RIS 50 may be a self-controlled RIS that includes processing circuitry for generating its own phase and magnitude responses and/or for coordinating communications among multiple UE devices (e.g., in an RIS-as-a-service configuration).

In this way, RIS 50 may help to relay wireless signals 46 between AP 34 and UE device 10 when object 51 blocks the LOS path between AP 34 and UE device 10 and/or when the propagation conditions from AP 34 to RIS 50 and from RIS 50 to UE device 10 are otherwise superior to the propagation conditions from AP 34 to UE device 10. Just a single RIS 50 may, for example, increase signal-to-interference-plus-noise ratio (SINR) for UE device 10 by as much as +20 dB and may increase effective channel rank relative to environments without an RIS. At the same time, RIS 50 only includes processing resources and consumes power required to perform control procedures, minimizing the cost of RIS 50 and maximizing the flexibility with which RIS 50 can be placed within the environment.

RIS 50 may include or store a codebook (sometimes referred to herein as a RIS codebook) that maps settings for antenna elements 48 (e.g., phase settings) to different signal beams (e.g., signal beams having corresponding orientation angles) formable by antenna elements 48 (sometimes referred to herein as RIS beams) RIS 50 may configure its antenna elements 48 to perform beamforming with respective beamforming coefficients (e.g., as given by the RIS codebook). The beamforming performed at RIS 50 may include two concurrently active RIS beams (e.g., where each RIS beam is generated using a corresponding set of beamforming coefficients).

In general, RIS 50 may relay (reflect) signals between two different devices. RIS 50 may form a first active RIS beam that has a beam pointing direction oriented towards the first device (sometimes referred to here as a RIS-AP beam when the first device is AP 34) and may concurrently form a second active RIS beam that has a beam pointing direction oriented towards the second device (sometimes referred to herein as a RIS-UE beam when the second device is UE device 10). In this way, when wireless signals 46 are incident from the first device (e.g., AP 34) within the first RIS beam, the antenna elements 48 on RIS 50 may receive the wireless signals incident from the direction the first device (e.g., AP 34) and may re-radiate (e.g., effectively reflect) the incident wireless signals within the second RIS beam and towards the direction of the second device (e.g., UE device 10). Conversely, when wireless signals 46 are incident from the second device (e.g., UE device 10) within the second RIS beam, the antenna elements 48 on RIS 50 may receive the wireless signals incident from the direction the second device (e.g., UE device 10) and may re-radiate (e.g., effectively reflect) the incident wireless signals within the first RIS beam and towards the direction of the first device (e.g., AP 34).

While referred to herein as "beams," the first RIS beam and the second RIS beams formed by RIS 50 do not include signals/data that are actively transmitted by RIS 50 but instead correspond to the impedance, phase, and/or magnitude response settings (e.g., reflection coefficients, impedances, etc.) for antenna elements 48 that shape the reflected signal beam of wireless signals 46 from a corresponding incident direction/angle onto a corresponding output direction/angle (e.g., the first RIS beam may be effectively formed using a first set of beamforming coefficients and the second RIS beam may be effectively formed using a second set of beamforming coefficients but are not associated with the active transmission of wireless signals by RIS 50).

Figure 2:
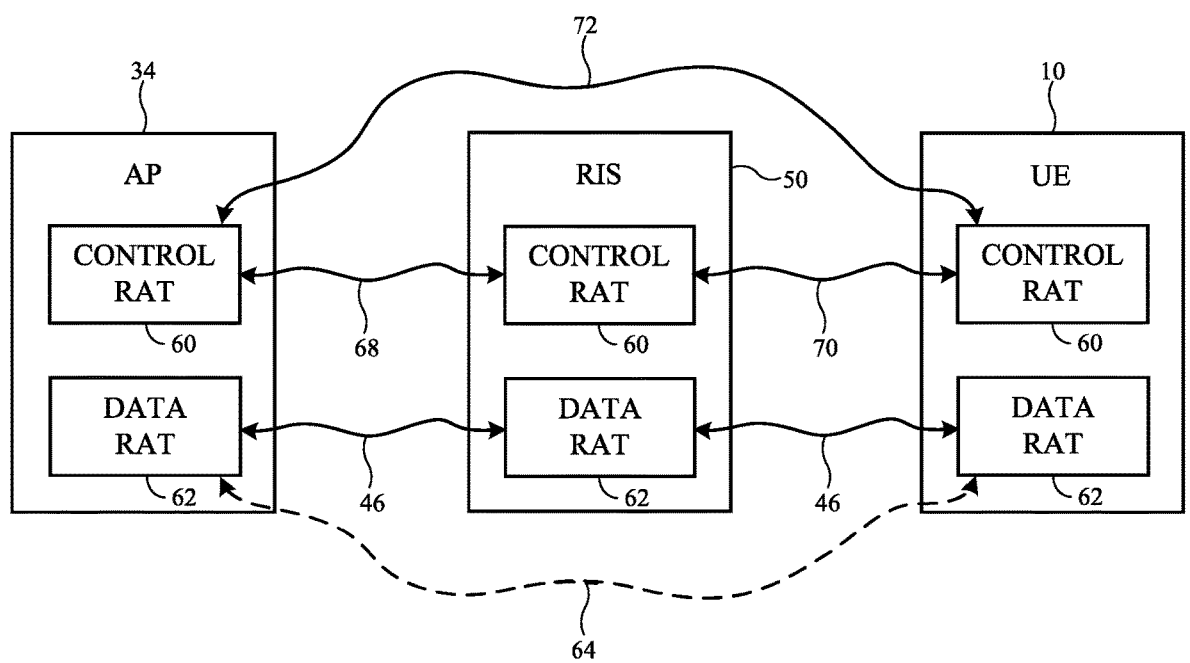
FIG. 2 is a diagram showing how an illustrative wireless access point, RIS, and user equipment device may communicate using both a data transfer radio access technology (RAT) and a control RAT in accordance with some embodiments.

FIG. 2 is a diagram showing how AP 34, RIS 50, and UE device 10 may communicate using both a control RAT and a data transfer RAT for establishing and maintaining communications between AP 34 and UE device 10 via RIS 50. As shown in FIG. 2, AP 34, RIS 50, and UE device 10 may each include wireless circuitry that operates according to a data transfer RAT 62 (sometimes referred to herein as data RAT 62) and a control RAT 60. Data RAT 62 may be a sub-THz communications RAT such as a 6G RAT that performs wireless communications at the frequencies of wireless signals 46. Control RAT 60 may be associated with wireless communications that consume much fewer resources and are less expensive to implement than the communications of data RAT 62. For example, control RAT 60 may be Wi-Fi, Bluetooth, a cellular telephone RAT such as a 3G, 4G, or 5G NR FR1 RAT, etc. As another example control RAT 60 may be an infrared communications RAT (e.g., where an infrared remote control or infrared emitters and sensors use infrared light to convey signals for the control RAT between UE device 10, AP 34, and/or RIS 50).

AP 34 and RIS 50 may use control RAT 60 to convey radio-frequency signals 68 (e.g., control signals) between AP 34 and RIS 50. UE device 10 and RIS 50 may use control RAT 60 to convey radio-frequency signals 70 (e.g., control signals) between UE device 10 and RIS 50. UE device 10, AP 34, and RIS 50 may use data RAT 62 to convey wireless signals 46 via reflection off antenna elements 48 of RIS 50. The wireless signals may be reflected, via the first RIS beam and the second RIS beam formed by RIS 50, between AP 34 and UE device 10. AP 34 may use radio-frequency signals 68 and control RAT 116 and/or UE device 10 may use radio-frequency signals 70 and control RAT 116 to discover RIS 50 and to configure antenna elements 48 to establish and maintain the relay of wireless signals 32 performed by antenna elements 48 using data RAT 62.

If desired, AP 34 and UE device 10 may also use control RAT 60 to convey radio-frequency signals 72 directly with each other (e.g., since the control RAT operates at lower frequencies that do not require line-of-sight). UE device 10 and AP 34 may use radio-frequency signals 72 to help establish and maintain THF communications (communications using data RAT 62) between UE device 10 and AP 34 via RIS 50. AP 34 and UE device 10 may also use data RAT 62 to convey wireless signals 46 directly (e.g., without reflection off RIS 50) when a LOS path is available.

If desired, the same control RAT 60 may be used to convey radio-frequency signals 68 between AP 34 and RIS 50 and to convey radio-frequency signals 70 between RIS 50 and UE device 10. If desired, AP 34, RIS 50, and/or UE device 10 may support multiple control RATs 60. In these scenarios, a first control RAT 60 (e.g., Bluetooth) may be used to convey radio-frequency signals 68 between AP 34 and RIS 50, a second control RAT 60 (e.g., Wi-Fi) may be used to convey radio-frequency signals 70 between RIS 50 and UE device 10, and/or a third control RAT 60 may be used to convey radio-frequency signals 72 between AP 34 and UE device 10. Processing procedures (e.g., work responsibilities) may be divided between data RAT 62 one or more control RAT 60 during discovery, initial configuration, data RAT communication between UE device 10 and AP 34 via RIS 50, and beam tracking of UE device 10.

Figure 3:
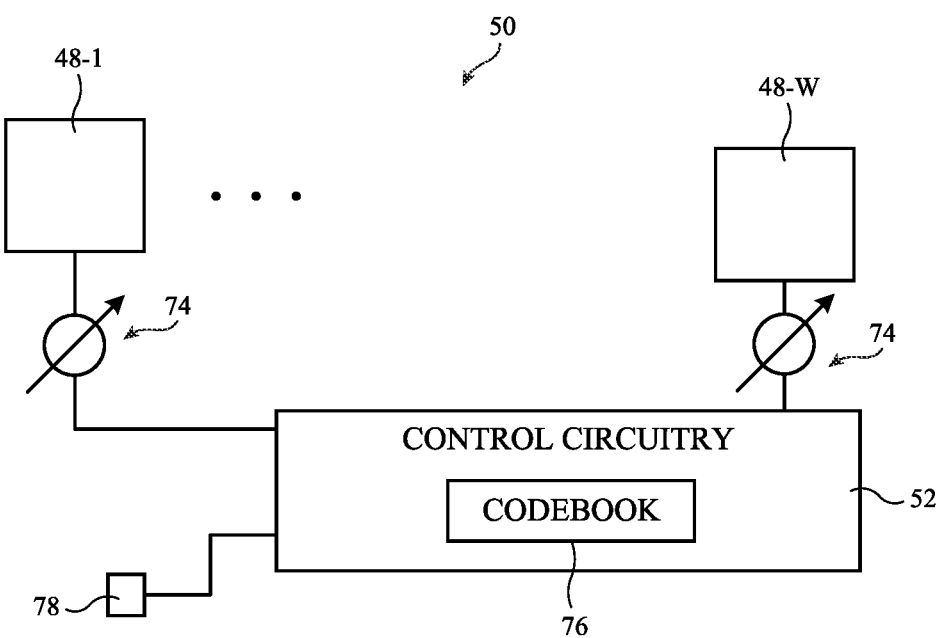
FIG. 3 is a diagram of an illustrative RIS in accordance with some embodiments.

FIG. 3 is a diagram of RIS 50. As shown in FIG. 3, RIS 50 may include a set of W antenna elements 48 (e.g., patches or other structures formed from metal or metamaterials on an underlying substrate). The W antenna elements 48 may be arranged in an array pattern (e.g., having sub-wavelength spacing). The array pattern may have rows and columns. Other array patterns may be used if desired. Each antenna element W may be coupled to a corresponding adjustable device 74. Adjustable devices 74 may include, as one example, diode switches. Each adjustable device 74 and its corresponding antenna element 48 may sometimes be referred to herein as a unit cell of RIS 50 (e.g., RIS 50 may have W unit cells).

Control circuitry 52 may provide control signals (e.g., a variable voltage) to adjustable devices 74 that configure each adjustable device 74 to impart a selected impedance to its corresponding antenna element 48. The impedance may effectively impart a corresponding phase shift to incident THF signals that are scattered (e.g., re-radiated or effectively reflected) by the antenna element. Adjustable devices 74 may therefore sometimes be referred to herein as phase shifters 74. Control circuitry 52 may transmit control signals to phase shifters 74 to control each phase shifter 74 to exhibit a corresponding phase setting. Each phase setting may cause the antenna element 48 to impart a corresponding phase shift to the wireless signals 46 scattered (reflected) by the antenna element. Put differently, each phase setting may configure the corresponding antenna element 48 to exhibit a particular reflection coefficient or impedance for incident signals. By selecting the appropriate settings (phase shift settings or applied phase shifts) for phase shifters 74, the array of antenna elements 48 may be configured to form RIS beams in different directions (e.g., to reflect/scatter wireless signals incident from incident angles associated with a first RIS beam onto corresponding output angles associated with a second RIS beam).

As shown in FIG. 3, RIS 50 may have one or more antennas 78. Antenna(s) 78 may include one or more of the W antenna elements 48 or may be separate from the W antenna elements 48 on RIS 50. Antenna(s) 78 may be coupled to a transceiver on RIS 50 and may be used to convey control signals over the control RAT. Control circuitry 52 may transmit control signals using antenna(s) 78 and/or may receive control signals using antenna(s) 78.

Control circuitry 52 may store a codebook 76 that maps different sets of settings (e.g., phase settings) for phase shifters 74 to different input/output angles (e.g., to different combinations of first and second RIS beams for RIS 50). Codebook 76 may be populated during manufacture, deployment, calibration, and/or regular operation of RIS 50. If desired, AP 34 (FIG. 1) may use the control RAT to update the entries of codebook 76. During operation, RIS 50 may be controlled to configure (program) phase shifters 74 to form the RIS beams necessary for RIS 50 to reflect wireless signals 46 between the location of AP 34 and the location of UE device 10, which may change over time. This may involve selection (calculation) of the appropriate set of phase settings (e.g., imparted phase shifts) for phase shifters 74 to form the RIS beams.

Four different entities may control RIS 50 (e.g., may program and adjust the settings of antenna elements 48 to form different RIS beams for reflecting wireless signals between one or more UE devices 10 and one or more AP's 34 over time). First, RIS 50 may be controlled by AP 34 (e.g., AP 34 may generate and configure the settings of antenna elements 48). Second, RIS 50 may be controlled by a UE device 10 (e.g., UE device 10 may generate and configure the settings of antenna elements 48). Third, RIS 50 may be controlled by a dedicated RIS control device or service controller separate from AP 34 and UE devices 10 (e.g., the service controller may generate and configure the settings of antenna elements 48). Fourth, RIS 50 may control itself (e.g., RIS 50 may generate and configure the settings of antenna elements 48).

However, in practice, RIS 50 has little knowledge of the radio conditions of AP 34 and the UE devices 10 that communicate via RIS 50 and typically has very limited processing resources to minimize cost and power. Similarly, AP 34 and a service controller may have limited knowledge of the radio conditions of the UE devices. Further, there may be situations where the user of a UE device 10 owns, operates, deploys, or uses their own RIS 50 and would therefore wish for the UE device 10 to have some amount of control over the RIS for communications purposes. Implementations in which RIS 50 is a UE-controlled RIS (sometimes referred to herein as a device-controlled RIS) are therefore described herein as an example. RIS 50 may therefore sometimes also be referred to herein as UE-controlled RIS 50 or device-controlled RIS 50.

In some implementations, RIS 50 is network independent, such that network 4 and AP 34 have no knowledge of the presence of RIS 50 in communication system 8 (e.g., network independent RIS's are transparent to the network). Such network independent RIS's are often owned by the end user of a UE device 10 or an enterprise that deployed the RIS and are controlled by the UE device, by the RIS itself, or a dedicated service controller. While network independent RIS's may simplify the integration of the RIS into the communication ecosystem, the wireless performance of UE device(s) 10 and/or network 4 may be improved if network 4 is aware of or has knowledge of the presence and operation of RIS 50, despite RIS 50 being controlled by UE device 10.

Network 4 may therefore be made aware of the presence RIS 50 and/or one or more properties about RIS 50 to optimize the wireless performance of the network. As such, RIS 50 may sometimes be referred to herein as a network-aware (NA) RIS. An NA RIS such as RIS 50 is not under the direct control of AP 34 or network 4 (e.g., network 4 does not configure the antenna elements 48 of the RIS). An NA RIS may be controlled by UE device 10, may control itself, or may be controlled by a service controller. Implementations in which RIS 50 is an NA RIS controlled by a UE device 10 are described herein as an example. RIS 50 may therefore sometimes also be referred to herein as network-aware (NA) UE-controlled RIS 50, NA device-controlled RIS 50, NA personal RIS (PRIS) 50, or simply as PRIS 50.

Figure 4:
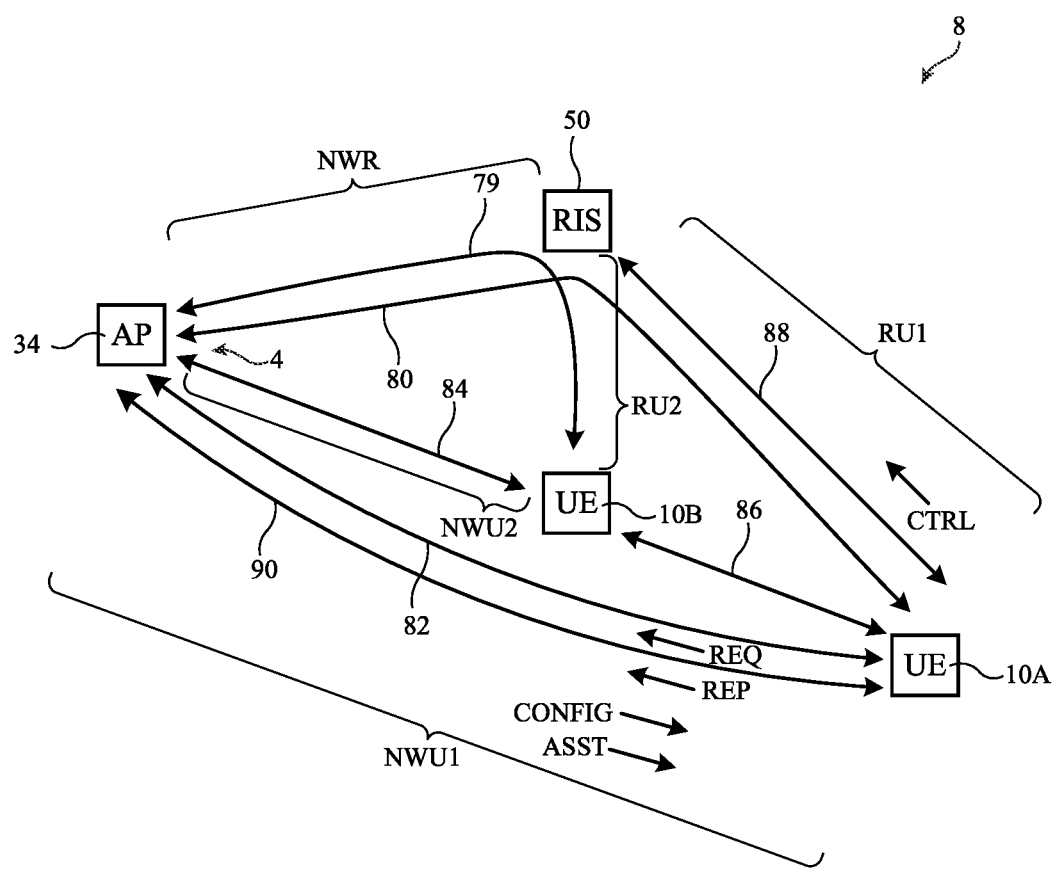
FIG. 4 is a diagram showing signals may be conveyed between user equipment devices, a wireless access point, and a network-aware RIS in accordance with some embodiments.

FIG. 4 is a diagram showing how signals may be conveyed between AP 34 (network 4), RIS 50, and multiple UE devices 10 in communication system 8. As shown in FIG. 4, communication system 8 may include one or more UE devices such as at least a first UE device 10A and a second UE device 10B. First UE device 10A may use the data RAT to convey wireless signals 46 (FIG. 1) directly with AP 34, as shown by arrow 82. First UE device 10A may also use the data RAT to convey wireless signals 46 with AP 34 via reflection off RIS 50, as shown by arrow 80. Similarly, second UE device 10B may use the data RAT to convey wireless signals 46 (FIG. 1) directly with AP 34, as shown by arrow 84. Second UE device 10B may also use the data RAT to convey wireless signals 46 with AP 34 via reflection off RIS 50, as shown by arrow 79.

First UE device 10A may control RIS 50 and may therefore sometimes be referred to herein as controller UE device 10A. For example, as shown by arrow 88, controller UE device 10A may use the control RAT to send control signals CTRL to RIS 50 that control the operation of RIS 50 (e.g., that program the antenna elements 48 on RIS 50 to form different RIS beams at different times for reflecting wireless signals 46 between AP 34 and one or more UE devices). Controller UE device 10A may also receive control signals from RIS 50 over the control RAT. The end user of controller UE device 10A may, for example, own, deploy, and/or operate RIS 50 (e.g., an NA PRIS). Second UE device 10B does not control RIS 50 but may communicate with AP 34 via RIS 50 (e.g., using the data RAT) and may therefore benefit from the presence of RIS 50 in communication system 8. Second UE device 10B may therefore sometimes be referred to herein as beneficiary device 10B.

Controller UE device 10A may use control signals CTRL to update the configuration of the antenna elements on RIS 50 over time to reflect wireless signals 46 between AP 34 and itself (as shown by arrow 80) and/or to reflect wireless signals 46 between AP 34 and one or more beneficiary UE devices such as beneficiary UE device 10B (as shown by arrow 79). Controller UE device 10A may generate and program the settings for the antenna elements 48 on RIS 50 and/or may determine whether the controller UE device and/or the beneficiary UE device(s) of RIS 50 should communicate with AP 34 directly or via RIS 50 based on the radio-frequency channel conditions between each of the different elements of communication system 8.

The channel conditions are related to the quality of radio-frequency propagation of wireless signals 46 between different network nodes. For example, the radio-frequency conditions of communication system 8 of FIG. 4 may be characterized by network-RIS channel conditions NWR (e.g., characterizing the channel conditions between AP 34 and RIS 50), network-UE channel conditions NWU1 (e.g., characterizing the channel conditions between AP 34 and controller UE device 10A), network-UE channel conditions NWU2 (e.g., characterizing the channel conditions between AP 34 and beneficiary UE device 10B), RIS-UE channel conditions RU1 (e.g., characterizing the channel conditions between RIS 50 and controller UE device 10A), and RIS-UE channel conditions RU2 (e.g., characterizing the channel conditions between RIS 50 and controller UE device 10B). AP 34, RIS 50, beneficiary UE device 10B, and/or controller UE device 10A may gather signal measurements (e.g., wireless performance metric data) from wireless signals 46 over time to assess channel conditions NWR, NWU1, NWU2, RU1, and/or RU2.

The control RAT and/or data RAT may be used to transmit information identifying each of the channel conditions to controller UE device 10A. For example, beneficiary UE device 10B may use the control RAT and/or data RAT to transmit signal measurements and/or other information identifying channel conditions NWU2 and/or RU2 to controller UE device 10A (as shown by arrow 86). Additionally or alternatively, RIS 50 may use the control RAT to transmit signal measurements and/or other information identifying channel conditions NWR, RU1, and/or RU2 to controller UE device 10A (as shown by arrow 88). Additionally or alternatively, network 4 (e.g., AP 34) may use the control RAT and/or data RAT to transmit signal measurements and/or other information identifying channel conditions NWR, NWU1, and/or NWU2 to controller UE device 10A (as shown by arrow 90). Controller UE device 10A may itself gather signal measurements and/or other information identifying channel conditions NWU1 and/or RU1. Controller UE device 10A may process the signal measurements and/or other information identifying channel conditions to determine whether controller UE device 10A will perform data RAT communications with AP 34 directly (as shown by arrow 82) or via RIS 50 (as shown by arrow 80), to determine whether each beneficiary UE device such as beneficiary UE device 10B will perform data RAT communications with AP 34 directly (as shown by arrow 84) or via RIS 50 (as shown by arrow 79), and/or to generate and program (configure) the settings for the antenna elements 48 on RIS 50 (e.g., using control signals CTRL). The settings for antenna elements 48 (e.g., as provided to RIS 50 in control signals CTRL) may control/configure RIS 50 to reflect data RAT signals between AP 34 and the location of controller UE device 10 and/or one or more beneficiary UE devices such as beneficiary UE device 10B.

Controller UE device 10A may also transmit information about RIS 50 to network 4 (e.g., AP 34) so network 4 has knowledge of RIS 50, thereby making RIS 50 a network-aware RIS. For example, controller UE device 10A may use the control RAT and/or the data RAT to transmit a message such as RIS report REP to AP 34, as shown by arrow 90. RIS report REP may include information identifying RIS 50 and/or information about one or more characteristics or capabilities of RIS 50. Since network 4 is made aware of RIS 50, network 4 may also assist controller UE device 10A in controlling or configuring RIS 50, if desired. To this end, network 4 may use the control RAT and/or data RAT to transmit assistance information ASST to controller UE device 10A, as shown by arrow 90. Network 4 may transmit assistance information ASST autonomously or upon request from controller UE device 10A. For example, controller UE device 10A may use the control RAT and/or the data RAT to transmit a request REQ to AP 34 for assistance information ASST, as shown by arrow 90. If desired, network 4 may also use RIS report REP or other measurement reports transmitted by the UE device(s) to adjust one or more AP beams on AP 34 (e.g., to optimize the wireless performance of AP 34 and/or network 4).

Figure 5:
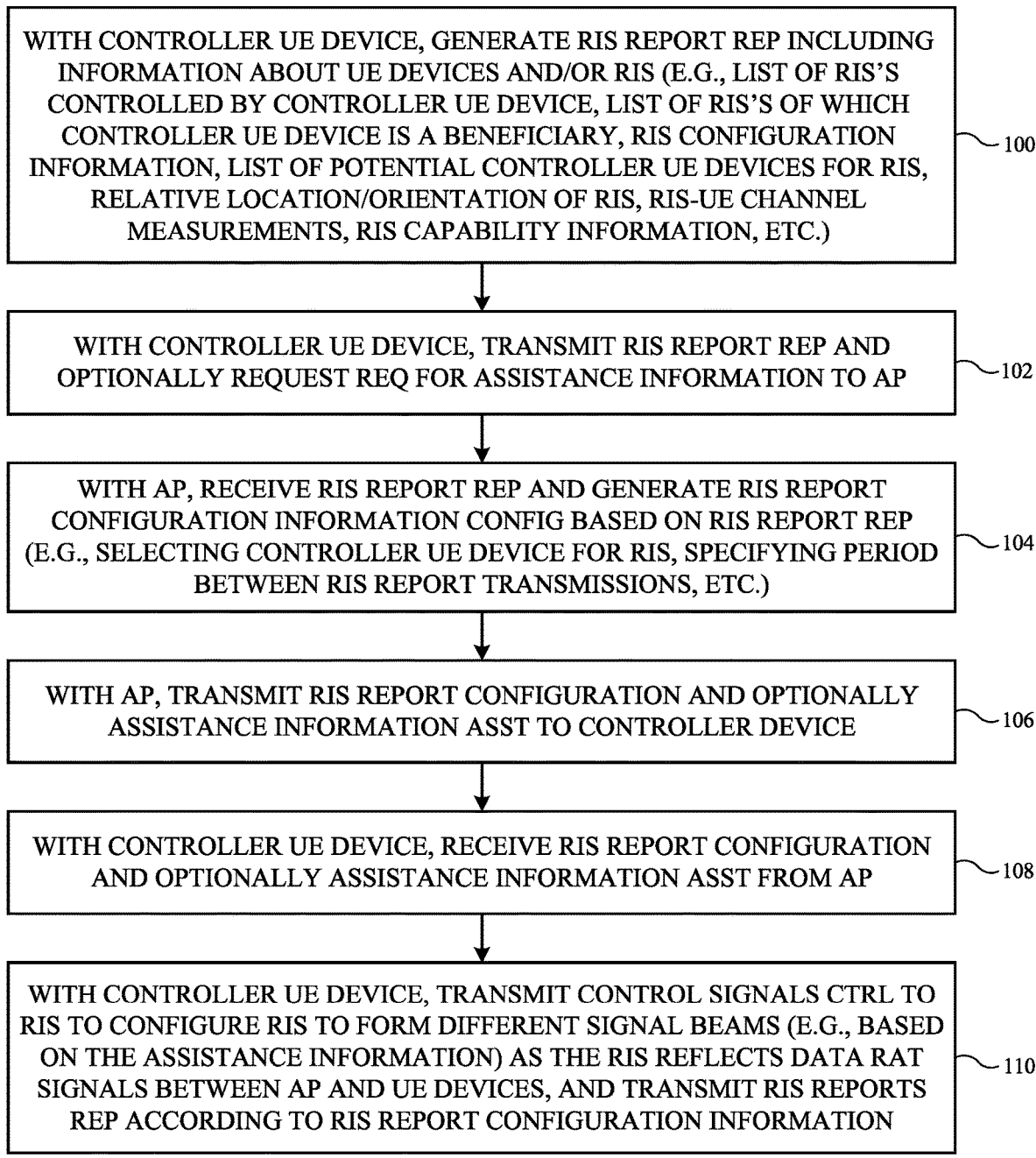
FIG. 5 is a flow chart of illustrative operations involved in using a user equipment device and a wireless access point to perform wireless communications using a network-aware RIS in accordance with some embodiments.

FIG. 5 is a flow chart of operations that may be performed by controller UE device 10A and AP 34 to perform wireless communications using a network-aware device-controlled RIS such as RIS 50 of FIG. 4. The operations of FIG. 5 may be performed after a user of or associated with UE device 10A has placed and deployed RIS 50 in the environment.

At operation 100, controller UE device 10A may generate RIS report REP. RIS report REP may include information about controller UE device 10A, one or more beneficiary UE devices 10B, and/or RIS 50. For example, RIS report REP may include a list identifying the RIS's 50 in system 8 for which controller UE device 10A is the controller UE. Additionally or alternatively, RIS report REP may include a list of RIS's for which controller UE device 10A is a beneficiary UE device (e.g., RIS's that controller UE device 10A uses for data RAT communications but does not directly control). These RIS's may include RIS's that are directly controlled by another UE device but that controller UE device 10A has at least some influence on the control for (e.g., via the other UE device or a separate controller). If desired, RIS 50 may be controlled by multiple UE devices 10 (e.g., multiple devices owned by the same user). In these situations, RIS report REP may include information identifying the UE devices 10 that control or are able to control RIS 50.

If desired, RIS report REP may include information about the characteristics and/or capabilities of each of the RIS's in the lists of RIS's. For example, RIS report REP may include information identifying the periodicity with which controller UE device 10A updates the configuration of the antenna elements 48 on RIS 50 (e.g., the periodicity with which controller UE device 10A updates the RIS beams formed by RIS 50). Additionally or alternatively, RIS report REP may include information identifying the relative or absolute position (location) and/or orientation of RIS 50. Additionally or alternatively, RIS report REP may include a measurement report identifying or associated with RIS-UE channel conditions RU1. If desired, the RIS report may include an indication of whether the signals reflected by RIS 50 are considered in the measurement report. Additionally or alternatively, RIS report REP may include information about the capabilities of RIS 50 (e.g., information about whether or not RIS 50 supports mobility in which RIS 50 changes position over time, information about the geometry of the antenna elements on RIS 50, information about the codebook or settings for the antenna elements on RIS 50, etc.).

At operation 102, controller UE device 10A may transmit RIS report REP to AP 34. If desired, controller UE device 10A may also transmit request REQ for assistance information ASST to AP 34. The example of FIG. 5 is illustrative and, in general, controller UE device 10A may transmit request REQ prior to operation 102 (e.g., concurrent with or prior to operation 100) or at other times during processing of the other operations of FIG. 5. The RIS report REP transmitted at operation 102 may be an initial RIS report REP. Controller UE device 10A may continue to transmit RIS reports REP after operation 102 (e.g., based on a configuration set by the network).

At operation 104, AP 34 may receive RIS report REP and (optionally) request REQ from controller UE device 10A. AP 34 may generate RIS report configuration information CONFIG based on the received RIS report REP. Configuration information CONFIG may include information identifying a minimum period to be used by controller UE device 10A for transmission of subsequent RIS reports REP (e.g., a minimum period between two RIS report transmissions). The network may reduce this periodicity (e.g., on the scale of minutes, hours, etc.) to further reduce the overhead produced on the network by RIS report transmission, particularly when the controller UE device frequently moves farther and nearer to RIS 50. When RIS 50 has multiple controller UE devices, AP 34 may select one of the controller UE devices to control RIS 50 and configuration information CONFIG may include information identifying the selected controller UE device.

At operation 106, AP 34 may transmit RIS report configuration information CONFIG to controller UE device 10A. When RIS 50 has multiple controller UE devices, AP 34 may also transmit RIS report configuration information CONFIG to the non-selected controller UE devices to instruct those UE devices not to transmit RIS reports REP, thereby minimizing overhead. AP 34 may also (optionally) transmit assistance information ASST to controller UE device 10A (e.g., autonomously or upon receiving a request from controller UE device 10A at operation 104). Assistance information ASST, configuration information CONFIG, request REQ, and/or RIS report REP may be transmitted using the data RAT and/or the control RAT (e.g., using non-access stratum (NAS) layer signaling or any other desired signaling).

If desired, AP 34 may optionally transmit assistance information ASST to beneficiary UE device 10B and beneficiary UE device 10B may forward assistance information ASST to beneficiary UE device 10B. While described herein in connection with the transmission of RIS report REP and configuration information CONFIG for the sake of simplicity, the transmission of request REQ and assistance information ASST may occur independently of transmission of RIS report REP and configuration information CONFIG (e.g., as needed by controller UE device 10A).

In general, controller UE device 10A may need to process the radio-frequency channel conditions between AP 34, RIS 50, beneficiary UE device(s) 10B, and/or controller UE device 10A to make decisions on how to control RIS 50 (e.g., to generate/select settings for the antenna elements on RIS 50). As such, controller UE device 10A should be made aware of as much of channel conditions NWR, RU1, RU2, NU2, and/or NU1 as possible. Controller UE device 10A may include a request for some of this channel information in the request REQ transmitted to AP 34 (e.g., the channel conditions known to AP 34). AP 34 may include the requested channel information (e.g., channel information NWR, NWU2, and/or NWU1 and/or corresponding signal measurements characterizing the channel conditions) in the assistance information ASST transmitted to controller UE device 10A.

In general, AP 34 may include any other desired information in assistance information ASST (e.g., autonomously or upon request by controller UE device 10A in request REQ) for use by controller UE device 10A in controlling RIS 50. Assistance information ASST may include, for example, information about the position of AP 34, information about AP beams of AP 34 (e.g., a beam index and/or beam direction), an indication that the AP beam has or will change, precoding used for channel state information reference signals (CSI-RS), channel estimations (e.g. based on a sounding reference signal (SRS)), and/or a channel estimation of network-RIS channel conditions NWR.

At operation 108, controller UE device 10A may receive configuration information CONFIG from AP 34. If desired, controller UE device 10A may also receive assistance information ASST from AP 34.

At operation 110, controller UE device 10A may control RIS 50 to reflect wireless signals 46 between AP 34 and controller UE device 10A and/or one or more beneficiary UE devices 10B (e.g., by transmitting control signals CTRL to RIS 50 to place the antenna elements on RIS 50 in different configurations over time). RIS 50 may then reflect wireless signals 46 between controller UE device 10A and/or one or more beneficiary UE devices 10B. In implementations where controller UE device 10A receives assistance information ASST from AP 34, controller UE device 10A may generate the settings/configurations for the antenna elements on RIS 50 and/or may determine whether to have RIS 50 reflect wireless signals or to have the UE device(s) communicate with AP 34 without reflection off RIS 50 based at least in part on assistance information ASST (e.g., channel condition information received from AP 34). In this way, network 4 may help to supplement the RIS control decisions performed by controller UE device 10A.

As RIS 50 reflects wireless signals 46, controller UE device 10A may continue to transmit (updated) RIS reports REP to AP 34 (e.g., according to the periodicity or other specifications given by the configuration information CONFIG received from AP 34). In this way, network 4 may maintain up-to-date information about RIS 50 while also allowing controller UE device 10A to make informed and efficient control decisions for RIS 50.

Figure 6:
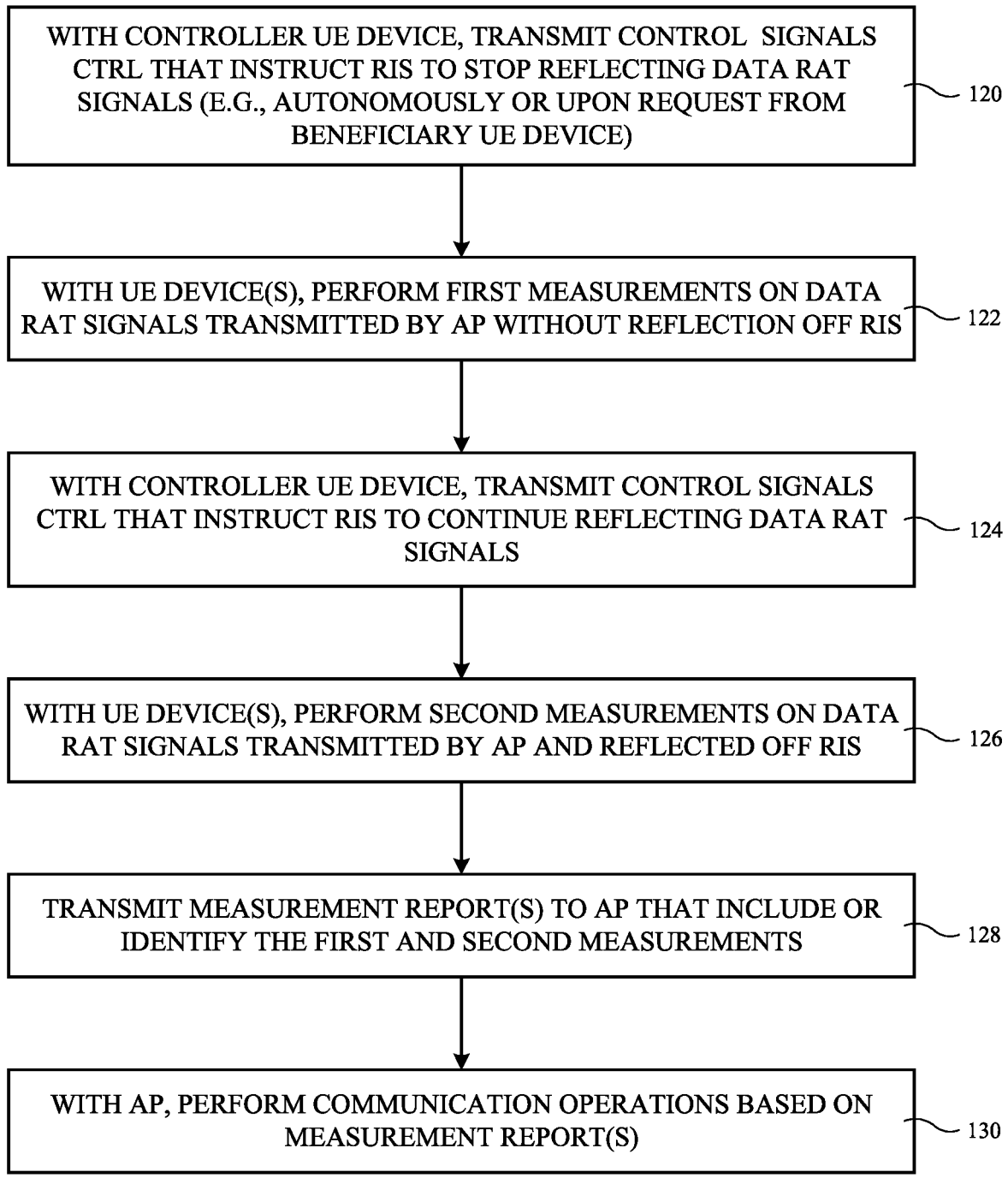
FIG. 6 is a flow chart of illustrative operations involved in gathering signal measurements with and without a network-aware RIS in accordance with some embodiments.

If desired, controller UE device 10A may periodically control RIS 50 to stop reflecting wireless signals 46 to allow measurement of direct signals from AP 34 (e.g., to allow for the UE device and/or the network to fully assess the radio channel conditions of system 8 for performing subsequent network decisions, controlling RIS 50, etc.). FIG. 6 is a flow chart of operations that may be performed by controller UE device 10A and AP 34 to periodically control RIS 50 to stop reflecting wireless signals 46 to allow measurement of direct signals from AP 34. The operations of FIG. 6 may, for example, be performed while processing operation 110 of FIG. 5, prior to the operations of FIG. 5, and/or after the operations of FIG. 5.

At operation 120, controller UE device 10A may transmit control signals CTRL to RIS 50 that instruct RIS 50 to stop reflecting wireless signals 46 (e.g., data RAT signals). Controller UE device 10A may instruct RIS 50 to stop reflecting wireless signals 46 autonomously (e.g., periodically) and/or in response to a request from a beneficiary UE device 10B. AP 34, which does not control RIS 50 and thus operates independently of RIS 50, may continue to convey wireless signals 46.

At operation 122, controller UE device 10A and/or the beneficiary UE device(s) 10B may perform first signal measurements (e.g., may gather wireless performance metric data characterizing radio channel conditions between the UE device(s) and AP 34) based on the wireless signals 46 transmitted by AP 34 and that are not reflected off RIS 50 (e.g., direct wireless signals 46). If desired, the beneficiary UE device(s) may transmit their first signal measurements to controller UE device 10A for subsequent processing.

At operation 124, controller UE device 10A may transmit control signals CTRL to RIS 50 that instruct RIS 50 to resume (continue) reflecting wireless signals 46.

At operation 126, controller UE device 10A and/or the beneficiary UE device(s) 10B may perform second signal measurements (e.g., may gather wireless performance metric data characterizing radio channel conditions between AP 34 and RIS 50 and between RIS 50 and the UE device(s)) based on the wireless signals 46 transmitted by AP 34 and reflected off RIS 50 (e.g., reflected wireless signals 46). If desired, the beneficiary UE device(s) may transmit their second signal measurements to controller UE device 10A for subsequent processing. If desired, operations 120-122 may be performed after operations 124-126.

At operation 128, controller UE device 10A may transmit one or more measurement reports (MR) to AP 34 that include or identify the first and/or second signal measurements (e.g., the radio channel conditions with and without reflection off RIS 50). Controller UE device 10A may, for example, transmit a first MR that includes the first signal measurements generated by controller UE device 10A and a second MR that includes the second signal measurements generated by controller UE device 10A, may transmit a single MR that includes both the first and second signal measurements generated by controller UE device 10A, may transmit a first MR that includes the first signal measurements generated by controller UE device 10A and the beneficiary UE device(s) 10B and a second MR that includes the second signal measurements generated by controller UE device 10A and the beneficiary UE device(s) 10B, and/or may transmit a single MR that includes the first and second signal measurements generated by both controller UE device 10A and the beneficiary UE device(s) 10B. If desired, the beneficiary UE device(s) may transmit one or more measurement reports to AP 34 that include the first and/or second signal measurements performed by the beneficiary UE device(s). If desired, the UE device(s) may transmit one or more measurement reports that include the first signal measurements prior to performing operation 124.

At operation 130, AP 34 may perform communication operations based on the measurement report(s) received from controller UE device 10A and/or the beneficiary UE device(s) 10B. For example, AP 34 use the channel condition information from the measurement reports to adjust or switch one or more AP beams, frequencies, or other network parameters, to perform handover, or to perform any other desired operations. Controller UE device 10A may use the signal measurements to update the configuration of RIS 50 if desired.

Making network 4 aware of RIS 50 may allow AP 34 to perform network actions or adaptations that optimize network performance given knowledge of RIS 50. This may include, for example, updating or adjusting the AP beams formed by AP 34 based on the measurement report(s) received from controller UE device 10A and/or the beneficiary UE device(s) 10B (e.g., at operation 130 of FIG. 6) and/or based on the RIS report REP received from controller UE device 10A (e.g., at operation 104 and/or operation 110 of FIG. 5).

Figure 7:
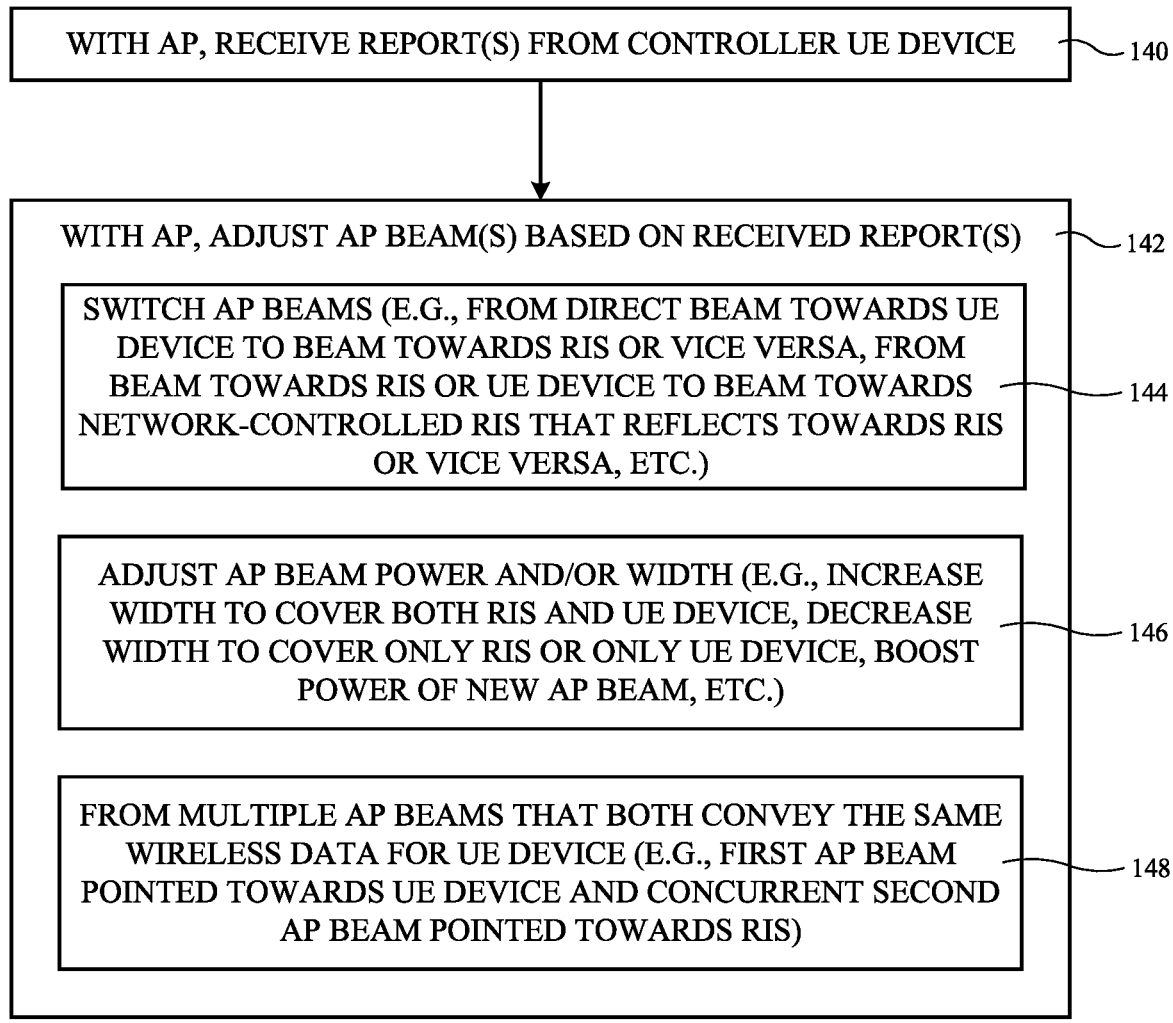
FIG. 7 is a flow chart of illustrative operations that may be performed by a wireless access point to adjust one or more signal beams based on information about a network-aware RIS received from a user equipment device in accordance with some embodiments.

FIG. 7 is a flow chart of operations that may be performed by AP 34 to adjust AP beams based on the measurement report(s) received from controller UE device 10A and/or the beneficiary UE device(s) 10B and/or based on the RIS report REP received from controller UE device 10A. The operations of FIG. 7 may, for example, be performed after operation 130 of FIG. 6 and/or after operation 104 of FIG. 5.

At operation 140 of FIG. 7, AP 34 may receive one or more reports from controller UE device 10A and/or one or more beneficiary UE devices 10B. The one or more reports may include measurement report(s) received from controller UE device 10A and/or the beneficiary UE device(s) 10B (e.g., at operation 130 of FIG. 6) and/or a RIS report REP received from controller UE device 10A (e.g., at operation 104 and/or operation 110 of FIG. 5).

Figure 8:
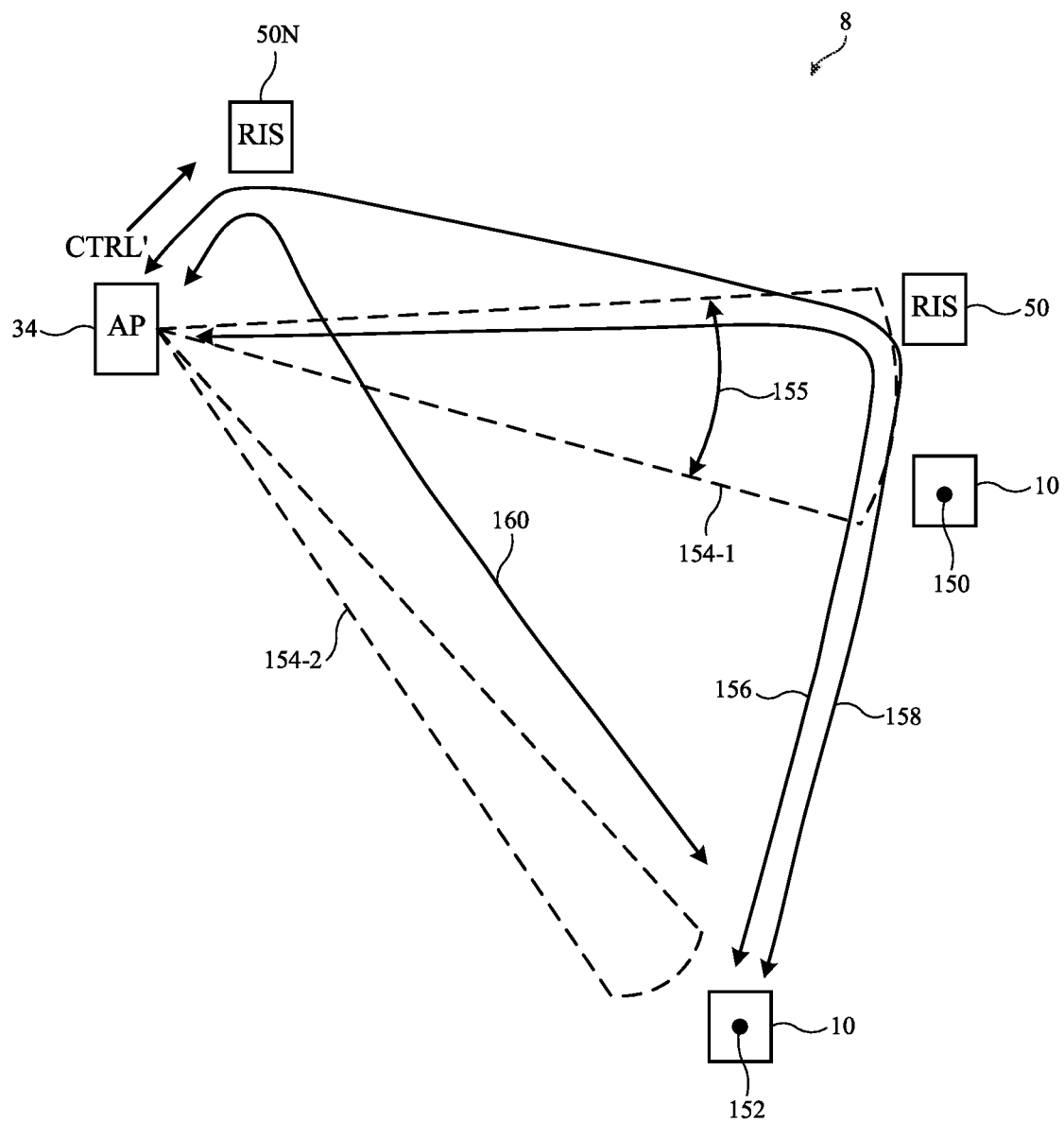
FIG. 8 is a diagram showing how an illustrative wireless access point may adjust one or more signal beams based on information about a network-aware RIS received from a user equipment device in accordance with some embodiments.

At operation 142, AP 34 may adjust one or more of its AP beams based on the received report(s) (e.g., to optimize the wireless performance of the network). For example, AP 34 may switch active AP beam(s) (operation 144). FIG. 8 is a diagram showing examples of how AP 34 may adjust AP beams based on the received report(s). As shown in FIG. 8, a UE device 10 (e.g., controller UE device 10A or beneficiary UE device 10B) may be at a location 150 at a first time and may move to a different location 152 at a second time (e.g., farther from RIS 50 than location 150) or vice versa.

The switch between active AP beams at operation 144 of FIG. 7 may be from a direct AP beam pointed towards a UE device to an AP beam pointed towards RIS 50 (e.g., for reflecting towards the UE device) or may be from an AP beam pointed towards RIS 50 to a direct AP beam pointed towards a UE device. For example, as shown in FIG. 8, when UE device 10 is at location 150, AP 34 may form an AP beam 154-1 pointed towards RIS 50, which reflects the wireless signals towards location 150 and thus UE device 10. When UE device 10 moves to location 152, UE device 10 may be located far enough from RIS 50 such that the radio channel condition between AP 34 and UE device 10 is superior to the radio channel condition from AP 34 to RIS 50 and from RIS 50 to UE device 10. As such, AP 34 may switch to an AP beam 154-2 pointed towards location 152. Conversely, when UE device 10 moves from location 152 to location 150, AP 34 may switch from AP beam 154-2 to AP beam 152-1.

If desired, network 4 may include one or more network-controlled RIS's such as network-controlled RIS 50N. AP 34 may transmit control signals CTRL' to network-controlled RIS 50N to configure the antenna elements 48 on network-controlled RIS 50N. UE devices 10 do not control network-controlled RIS 50N. In implementations where network 4 includes network-controlled RIS 50N, the switch between active AP beams at operation 144 of FIG. 7 may be from a direct AP beam pointed towards a UE device or an AP beam pointed towards RIS 50 (for reflecting towards the UE device) to an AP beam pointed towards network-controlled RIS 50N, or vice versa.

For example, as shown in FIG. 8, AP 34 may use control signals CTRL' to configure network-controlled RIS 50N to reflect wireless signals 46 between AP 34 and UE device 10 (e.g., as shown by arrow 160) or to configure network-controlled RIS 50N to reflect wireless signals 46 between AP 34 and RIS 50, where RIS 50 then reflects the wireless signals between network-controlled RIS 50N and UE device 10 (e.g., as shown by arrow 158). AP 34 may switch between using a direct AP beam (e.g., AP beam 154-2) and an AP beam oriented towards network-controlled RIS 50N (e.g., while also configuring network-controlled RIS 50N to reflect wireless signals 34 directly towards location 152 or towards RIS 50 for reflection towards location 152), depending on which configuration will optimize network performance (e.g., as identified from the report(s) received from the UE device(s)).

Returning to FIG. 7, the AP beam adjustment at operation 142 may also include an adjustment to the power and/or width of the AP beam (at operation 144). This may include, for example, increasing the width of the AP beam so the AP beam overlaps both UE device 10 and RIS 50 or decreasing the width of the AP beam so the AP beam overlaps only UE device 10 or only RIS 50 (e.g., for reflecting the AP beam towards the UE device without the UE device also overlapping the UE device).

For example, as shown in FIG. 8, when UE device 10 is at location 150, AP 34 may increase the width of AP beam 154-1, as shown by arrow 155, such that the AP beam overlaps both RIS 50 and UE device 10. AP 34 may thereby use the same AP beam to both transmit wireless signals 46 directly to UE device 10 at location 150 and via reflection of the wireless signals off RIS 50. For example, a first portion of the AP beam may be received directly by UE device 10 without reflection off RIS 50 whereas a second portion of the AP beam is received via reflection off RIS 50. If desired, AP 34 may narrow AP beam 154-1 to only point at RIS 50 for reflection to location 150 or may narrow AP beam 154-1 to only point at location 150. If UE device 10 moves to location 152, AP 34 may, for example, switch to AP beam 154-2 and may increase the power of the AP beam to narrow the beam allowing it to reach location 152 with satisfactory signal level, if desired. AP 34 may switch between any of these AP beam configurations or other configurations depending on which configuration will optimize network performance given the current channel conditions (e.g., as identified from the report(s) received from the UE device(s)).

Returning to FIG. 7, the AP beam adjustment at operation 142 may also include the formation of multiple concurrent AP beams that both convey the same wireless data for UE device 10. If desired, one of the AP beams may point directly at UE device 10 whereas the other AP beam is reflected off network-controlled RIS 50N towards UE device 10 or RIS 50 towards UE device 10.

For example, as shown in FIG. 8, when UE device 10 is at location 152, AP 34 may form a first AP beam 154-1 oriented towards RIS 50. AP 34 may concurrently form a second AP beam 154-2 oriented towards location 152 (e.g., directly towards UE device 10). AP 34 may concurrently convey the same wireless data (e.g., the wireless data may be duplicated between AP beam 154-1 and AP beam 154-2) over both AP beam 154-1 and 154-2. The wireless signals 46 conveyed by AP beam 154-2 may pass between AP 34 and UE device 10 directly and without reflection off a RIS whereas the wireless signals 46 conveyed by AP beam 154-1 may be conveyed between AP 34 and location 152 via reflection off RIS 50, as shown by arrow 156 (e.g., according to the configuration of the antenna elements 48 on RIS 50 as set by the controller UE device). In other implementations, AP 34 may form an AP beam pointed towards network-controlled RIS 50N for reflection to location 152 (as shown by arrow 160) concurrent with forming AP beam 154-2 and/or AP beam 154-1. Duplicating the radio-frequency paths used to convey wireless data for UE device 10 in this way may help to boost the overall throughput of UE device 10, for example.

Any of the operations described herein as being performed by AP 34 may be distributed across two or more AP's 34 and/or any other nodes of network 4. UE device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods and operations described above in connection with FIGS. 1-8 may be performed by the components of UE device 10, RIS 50, and/or AP 34 using software, firmware, and/or hardware (e.g., dedicated circuitry or hardware). Software code for performing these operations may be stored on non-transitory computer readable storage media (e.g., tangible computer readable storage media) stored on one or more of the components of UE device 10, RIS 50, and/or AP 34. The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of UE device 10, RIS 50, and/or AP 34. The processing circuitry may include microprocessors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. A method of operating a user equipment (UE) device to communicate with a wireless access point, the method comprising:

receiving, from the wireless access point, a first message;

transmitting a control signal to a reconfigurable intelligent surface (RIS) having a plurality of antenna elements, the control signal identifying a setting for the plurality of antenna elements on the RIS that is selected based on the first message;

transmitting a wireless signal to the wireless access point via reflection off of the RIS, the plurality of antenna elements on the RIS being configured using the setting; and transmitting, to the wireless access point, a second message that includes information associated with the RIS.

2. The method of claim 1, wherein the second message comprises a list of RIS's that are controlled by the UE device.

3. The method of claim 1, wherein the second message comprises a periodicity with which the UE device transmits the control signal to the RIS.

4. The method of claim 1, wherein the second message comprises a list of UE devices that control the RIS.

5. The method of claim 1, wherein the second message comprises a location or an orientation of the RIS.

6. The method of claim 1, wherein the second message comprises a measurement report associated with a channel condition between the RIS and the UE device.

7. The method of claim 1,
wherein the first message identifies a periodicity with which the UE device is to transmit the second message.

8. The method of claim 1, further comprising:
receiving a first signal from the wireless access point via reflection off the RIS;
performing, using one or more processors, a first signal measurement on the first signal;
transmitting an additional control signal that instructs the RIS to stop reflecting the wireless signal;
receiving a second signal from the wireless access point via reflection off the RIS, the RIS being configured to stop reflecting the wireless signal;
performing, using the one or more processors, a second signal measurement on the second signal; and
including in the second message, using the one or more processors, the first signal measurement and the second signal measurement.

9. The method of claim 1, further comprising:
transmitting, to the wireless access point, a request for information from the wireless access point, wherein the first message includes the information.

10. The method of claim 9, wherein the information comprises a position of the wireless access point, information identifying a signal beam of the wireless access point, an indicator identifying that the signal beam of the wireless access point has changed, or radio-frequency channel condition information associated with the wireless access point.

11. The method of claim 1,
wherein the first message identifies:
a position of the wireless access point,
information about a signal beam of the wireless access point,
an indicator identifying that the signal beam of the wireless access point has changed, or
radio-frequency channel condition information associated with the wireless access point.

12. A method of operating a wireless access point to communicate with a user equipment (UE) device, the method comprising:
transmitting wireless signals to the UE device via reflection of a signal beam off a reconfigurable intelligent surface (RIS), the RIS being controlled by the UE device;
receiving a report from the UE device; and
adjusting, using one or more processors, the signal beam based on the report, wherein adjusting the signal beam includes switching between a first signal beam pointed towards the RIS and a second signal beam pointed towards the UE device.

13. The method of claim 12, wherein the report comprises radio-frequency channel condition information and adjusting the signal beam comprises adjusting the signal beam based on the radio-frequency channel condition information.

14. The method of claim 12, wherein the report comprises information about the RIS and adjusting the signal beam comprises adjusting the signal beam based on the information about the RIS.

15. The method of claim 12, further comprising:
transmitting, to the UE device, information about the signal beam.

16. The method of claim 12, wherein adjusting the signal beam comprises adjusting a width of the signal beam.

17. The method of claim 12, wherein the signal beam is oriented towards an additional RIS, the method further comprising:
transmitting a control signal to the additional RIS that configures antenna elements on the additional RIS to reflect the wireless signals between the wireless access point and the RIS.

18. A method of operating a user equipment (UE) device to communicate with a wireless access point, the method comprising:
transmitting a control signal to a reconfigurable intelligent surface (RIS) having a plurality of antenna elements, the control signal identifying a setting for the plurality of antenna elements on the RIS;
transmitting a wireless signal to the wireless access point via reflection off of the RIS, the plurality of antenna elements on the RIS being configured using the setting; and
transmitting, to the wireless access point, a message that includes
a list of RIS's that are controlled by the UE device,
a periodicity with which the UE device transmits the control signal to the RIS,
a list of UE devices that control the RIS,
a location of the RIS,
an orientation of the RIS, or
a measurement report associated with a channel condition between the RIS and the UE device.

19. The method of claim 18, further comprising:
receiving an additional message from the wireless access point; and
selecting, using one or more processors, the setting for the plurality of antenna elements on the RIS based on the additional message.

20. The method of claim 18, wherein transmitting the wireless signal comprises transmitting wireless data in a first signal beam oriented towards the RIS, the method further comprising:
transmitting, to the wireless access point concurrent with transmitting the wireless data in the first signal beam, a duplicate of the wireless data in a second signal beam oriented towards the wireless access point.

* * * * *